United States Patent [19]

Crooks, Jr.

[11] 4,453,224
[45] Jun. 5, 1984

[54] ORBITING OBJECTIVE LENS TELESCOPE SYSTEM AND METHOD

[75] Inventor: James W. Crooks, Jr., San Diego, Calif.

[73] Assignee: General Dynamics Electronics Division, San Diego, Calif.

[21] Appl. No.: 179,426

[22] Filed: Aug. 19, 1980

[51] Int. Cl.³ .................. G06F 15/20; G02B 23/00
[52] U.S. Cl. .................................... 364/525; 350/537
[58] Field of Search ............... 364/420, 525; 350/17, 350/22, 33, 452, 245; 126/440, 425

[56] References Cited

U.S. PATENT DOCUMENTS

| | | | |
|---|---|---|---|
| 3,629,592 | 12/1971 | Courrier | 350/22 |
| 3,923,400 | 12/1975 | Hardy | 350/17 |
| 4,100,482 | 7/1978 | Yamashita et al. | 364/420 |

OTHER PUBLICATIONS

"Just Over the Horizon in Space", published by the American Institute of Aeronautics and Astronautics, May 1980, pp. 64–76.
"The Dancing Wu Li Masters", by Zukav, published by William Morrow & Company, 1979, pp. 201–204.

Primary Examiner—Gary Chin
Attorney, Agent, or Firm—Brown & Martin

[57] ABSTRACT

A large objective lens is placed in a highly eccentric orbit about the earth. The orbit and orientation of the lens are carefully chosen so that it focuses light or other radiation from a preselected astronomical object into an image which slowly moves across the surface of the earth. A row of optical sensing units is located on the surface of the earth so that the image focused by the orbiting objective lens will travel substantially perpendicularly across the row during an observation. Output data generated from the sensing units may be multiplexed and fed to a real time processor which produces display signals. Each of the sensing units provides one scan line of the image being observed. The display signals are fed to a suitable display device which produces a picture of the preselected astronomical object. The objective lens may comprise a large flexible Fresnel zone plate or a flexible convex lens carried by a bicycle wheel-type supporting structure. The lens and supporting structure may be unfolded from compact cargo configurations and rotated after being placed into orbit.

19 Claims, 31 Drawing Figures

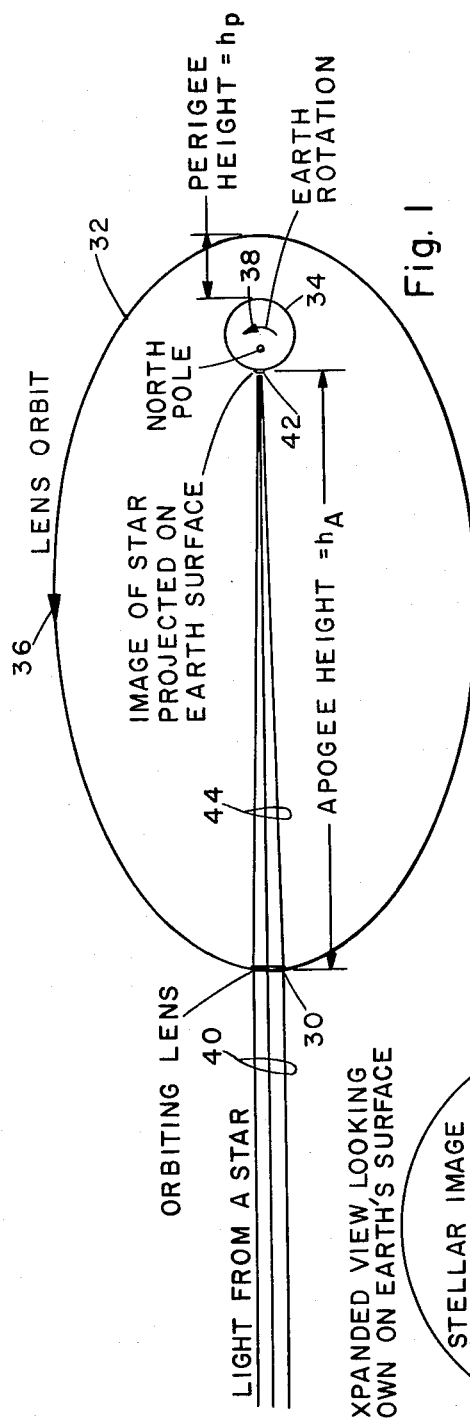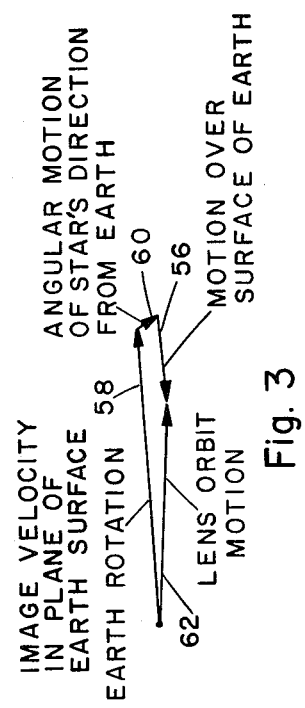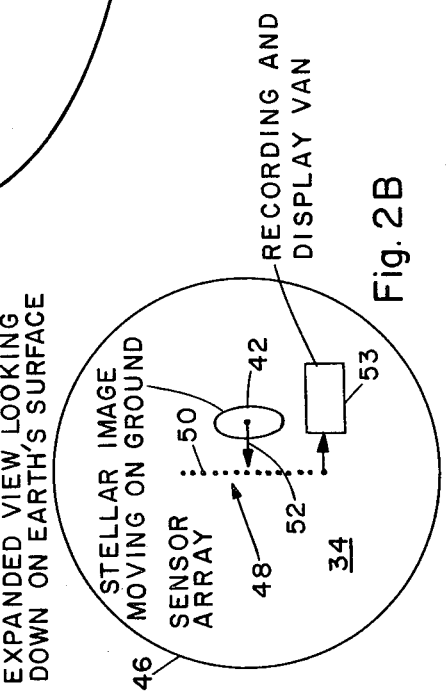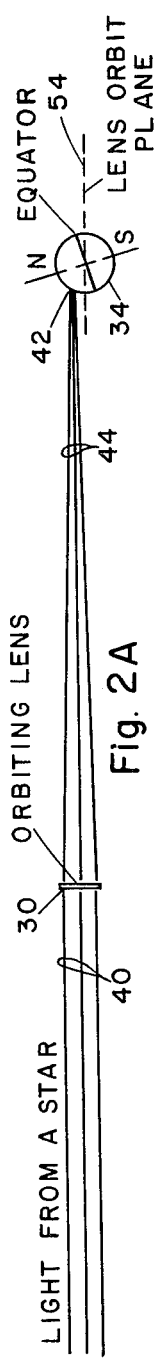

| CASE | ① | ② | ③ |
|---|---|---|---|
| $h_A$ | $2 \times 10^8$ METERS | $4.25 \times 10^8$ METERS | $1.5 \times 10^9$ METERS |
| $h_p$ | $1.5 \times 10^6$ METERS | $3 \times 10^7$ METERS | $1.5 \times 10^9$ METERS |
| ORBIT PERIOD | 4 DAYS | 13 DAYS | 1 YEAR |

(LENS HEIGHT = APOGEE HEIGHT = $h_A$)

| PLANET NAME | RADIUS (METERS) | DISTANCE (AU) | IMAGE RADIUS ON SURFACE OF EARTH | | |
|---|---|---|---|---|---|
| | | | CASE 1 $h_A = 2 \times 10^8$ (METERS) | CASE 2 $h_A = 4.25 \times 10^8$ (METERS) | CASE 3 $h_A = 15 \times 10^8$ (METERS) |
| MARS | $3.31 \times 10^6$ | .3814 | 11,620 | 24,693 | 87,150 |
| | | 2.6660 | 1,662 | 5,582 | 12,465 |
| JUPITER | $69.8 \times 10^6$ | 3.951 | 23,678 | 50,316 | 177,585 |
| | | 6.548 | 14,493 | 30,797 | 108,696 |
| SATURN | $57.55 \times 10^6$ | 8.008 | 9,621 | 20,444 | 72,158 |
| | | 11.070 | 6,959 | 14,789 | 52,196 |
| URANUS | $25.5 \times 10^6$ | 17.277 | 1,975 | 4,199 | 14,819 |
| | | 21.087 | 1,619 | 3,440 | 12,141 |
| NEPTUNE | $25 \times 10^6$ | 28.8 | 1,162 | 2,469 | 8,715 |
| | | 31.315 | 1,068 | 2,271 | 8,015 |
| PLUTO | $4 \times 10^6$ | 28.692 | 187 | 397 | 1,400 |
| | | 50.344 | 106 | 226 | 798 |

Fig. 8

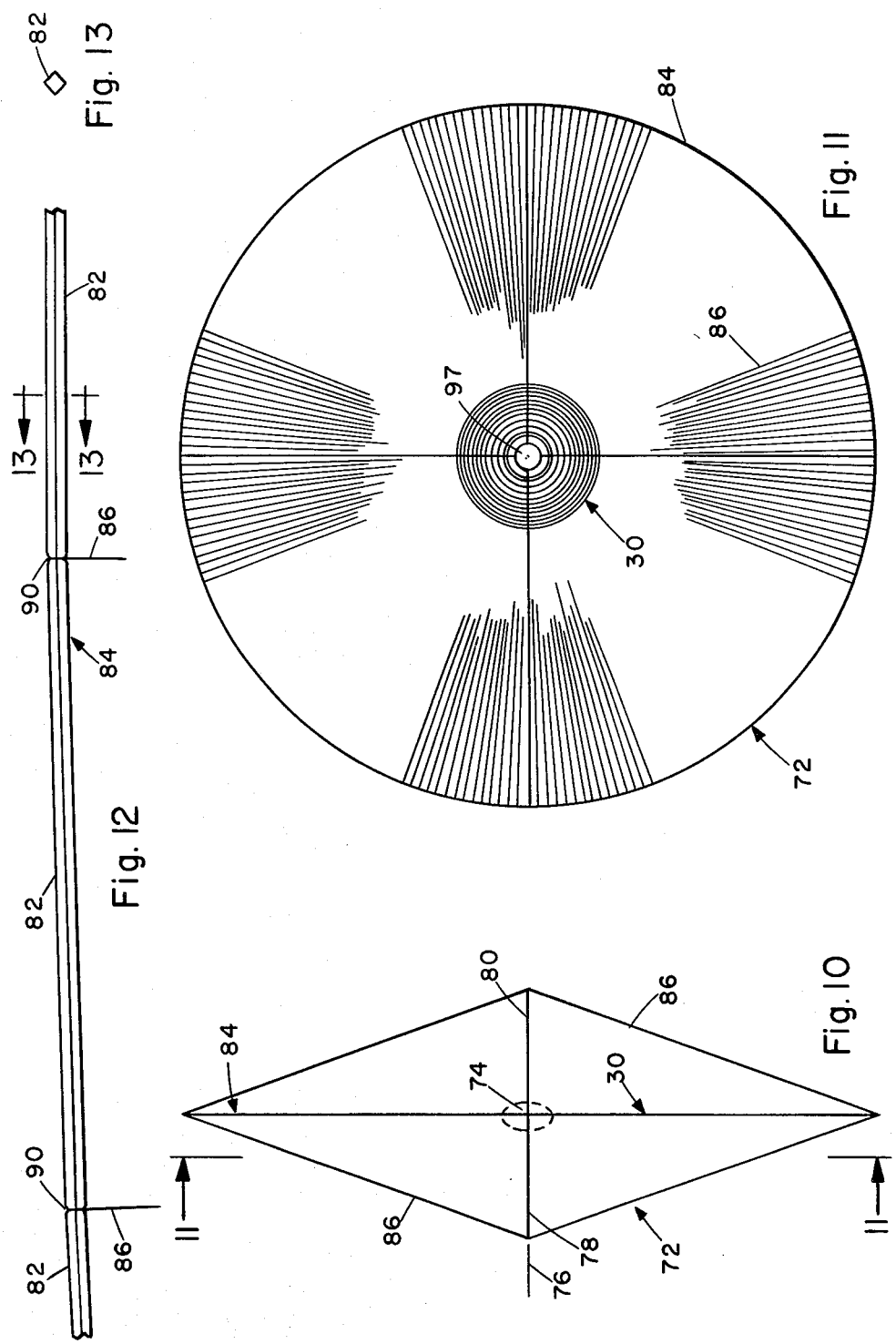

(FOR λ=0.56 MICROMETER; FOCAL LENGTH=2×10⁸ METERS; OVERALL DIAMETER≈100 METERS)

| ZONE NUMBER | OPAQUE | OUTER ZONE EDGE RADIUS (METERS) | ZONE RADIAL WIDTH (METERS) |
|---|---|---|---|
| 1 | YES | 10.58 | 10.58 |
| 2 | NO | 14.97 | 4.39 |
| 3 | YES | 18.33 | 3.36 |
| 4 | NO | 21.17 | 2.84 |
| 5 | YES | 23.66 | 2.49 |
| 6 | NO | 25.29 | 1.63 |
| 7 | YES | 28.00 | 2.71 |
| 8 | NO | 29.93 | 1.93 |
| 9 | YES | 31.75 | 1.82 |
| 10 | NO | 33.47 | 1.72 |
| 11 | YES | 35.10 | 1.63 |
| 12 | NO | 36.66 | 1.56 |
| 13 | YES | 38.16 | 1.50 |
| 14 | NO | 39.60 | 1.44 |
| 15 | YES | 40.99 | 1.39 |
| 16 | NO | 42.33 | 1.34 |
| 17 | YES | 43.63 | 1.30 |
| 18 | NO | 44.90 | 1.27 |
| 19 | YES | 46.13 | 1.23 |
| 20 | NO | 47.33 | 1.20 |
| 21 | YES | 48.50 | 1.17 |
| 22 | NO | 49.64 | 1.14 |
| 23 | YES | 50.75 | 1.11 |

Fig. 16

| LENS DIAMETER (METERS) | ANGULAR RESOLUTION (RADIANS) | CASE 1 $h_A=2\times10^8$ METERS | | | CASE 2 $h_A=4.2\times10^8$ METERS | | | CASE 3 $h_A=1.5\times10^9$ METERS | | |
|---|---|---|---|---|---|---|---|---|---|---|
| | | IMAGE ELEMENT (METERS) * | OUTER ZONE NUMBER | OUTER ZONE WIDTH (METERS) | IMAGE ELEMENT (METERS) * | OUTER ZONE NUMBER | OUTER ZONE WIDTH (METERS) | IMAGE ELEMENT (METERS) * | OUTER ZONE NUMBER | OUTER ZONE WIDTH (METERS) |
| 100 | $3.42\times10^{-9}$ | 0.684 | 22 | 1.11 | 1.44 | 11 | 2.38 | 5.13 | 2 | 9.37 |
| 200 | $1.71\times10^{-9}$ | 0.342 | 89 | 0.55 | 0.72 | 42 | 1.18 | 2.57 | 11 | 4.34 |
| 400 | $8.6\times10^{-10}$ | 0.171 | 357 | 0.28 | 0.36 | 168 | 0.60 | 1.28 | 46 | 2.16 |
| 500 | $6.8\times10^{-10}$ | 0.137 | 558 | 0.22 | 0.29 | 261 | 0.48 | 1.03 | 72 | 1.21 |
| 800 | $4.3\times10^{-10}$ | 0.086 | 1,428 | 0.14 | 0.18 | 673 | 0.30 | 0.64 | 184 | 1.09 |
| 1000 | $3.42\times10^{-10}$ | 0.068 | 2,232 | 0.10 | 0.144 | 1,050 | 0.24 | 0.513 | 285 | 0.87 |
| 2000 | $1.71\times10^{-10}$ | 0.034 | 8,929 | 0.06 | 0.072 | 4,201 | 0.12 | 0.257 | 1152 | 0.43 |

* RADIUS OF FIRST NULL FOR POINT LIGHT SOURCE PROJECTED ON THE SURFACE OF THE GROUND

ALL COMPUTATIONS FOR $\lambda=0.56\times10^{-6}$ METERS: $h_A$=LENS HEIGHT AT APOGEE =FOCAL DISTANCE OF LENS

Fig. 17

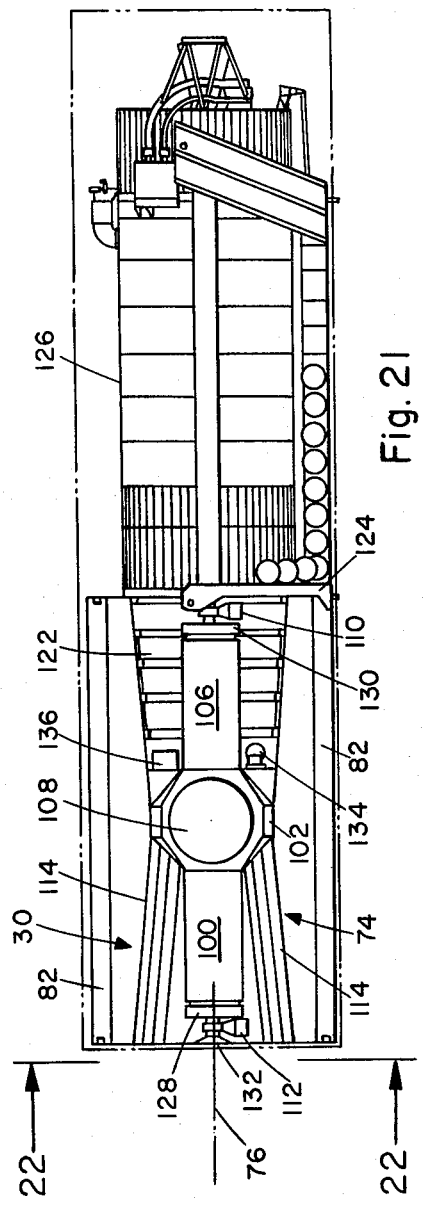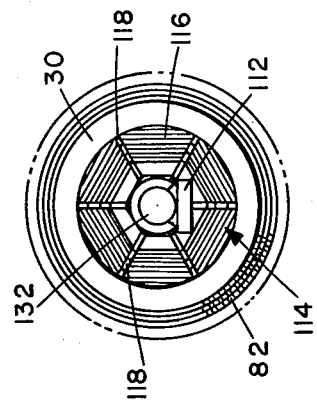

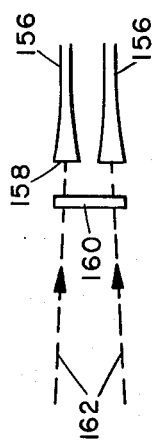
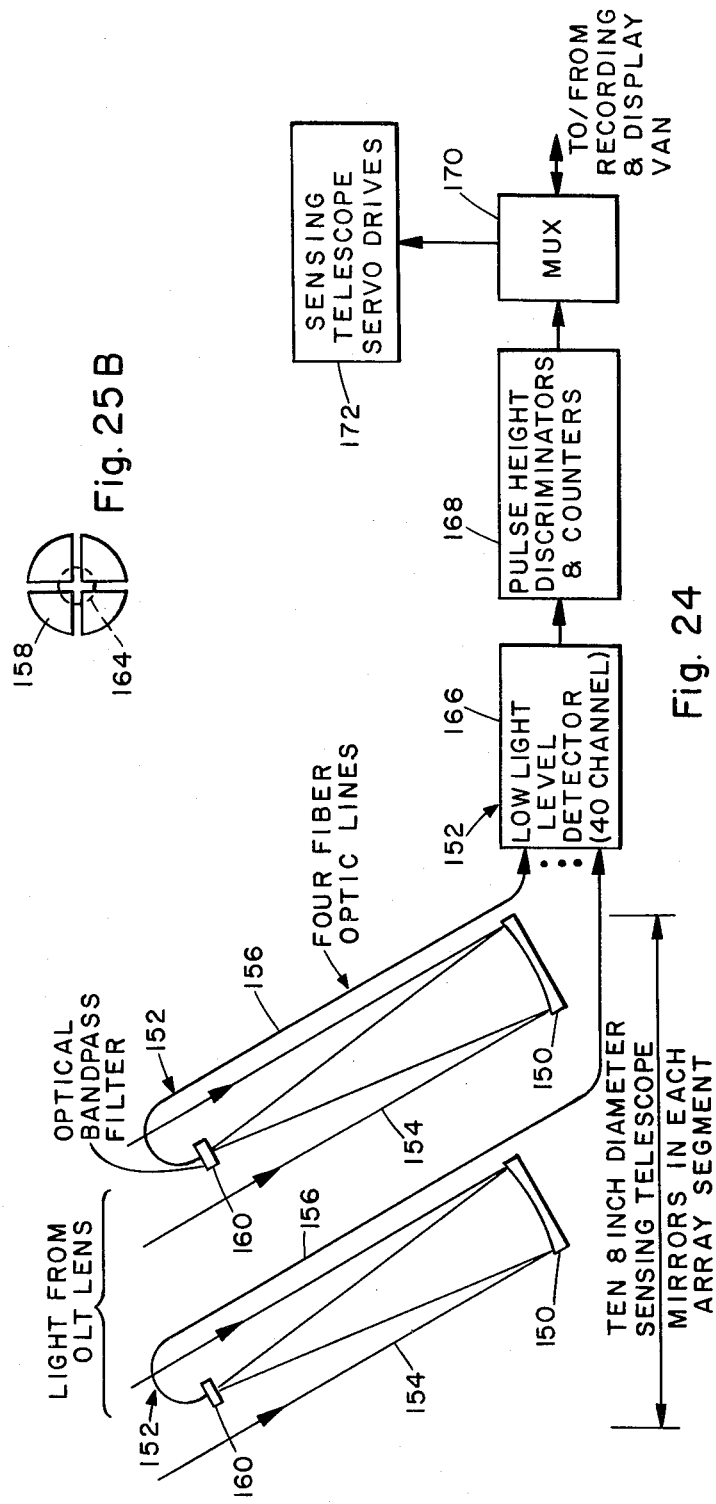

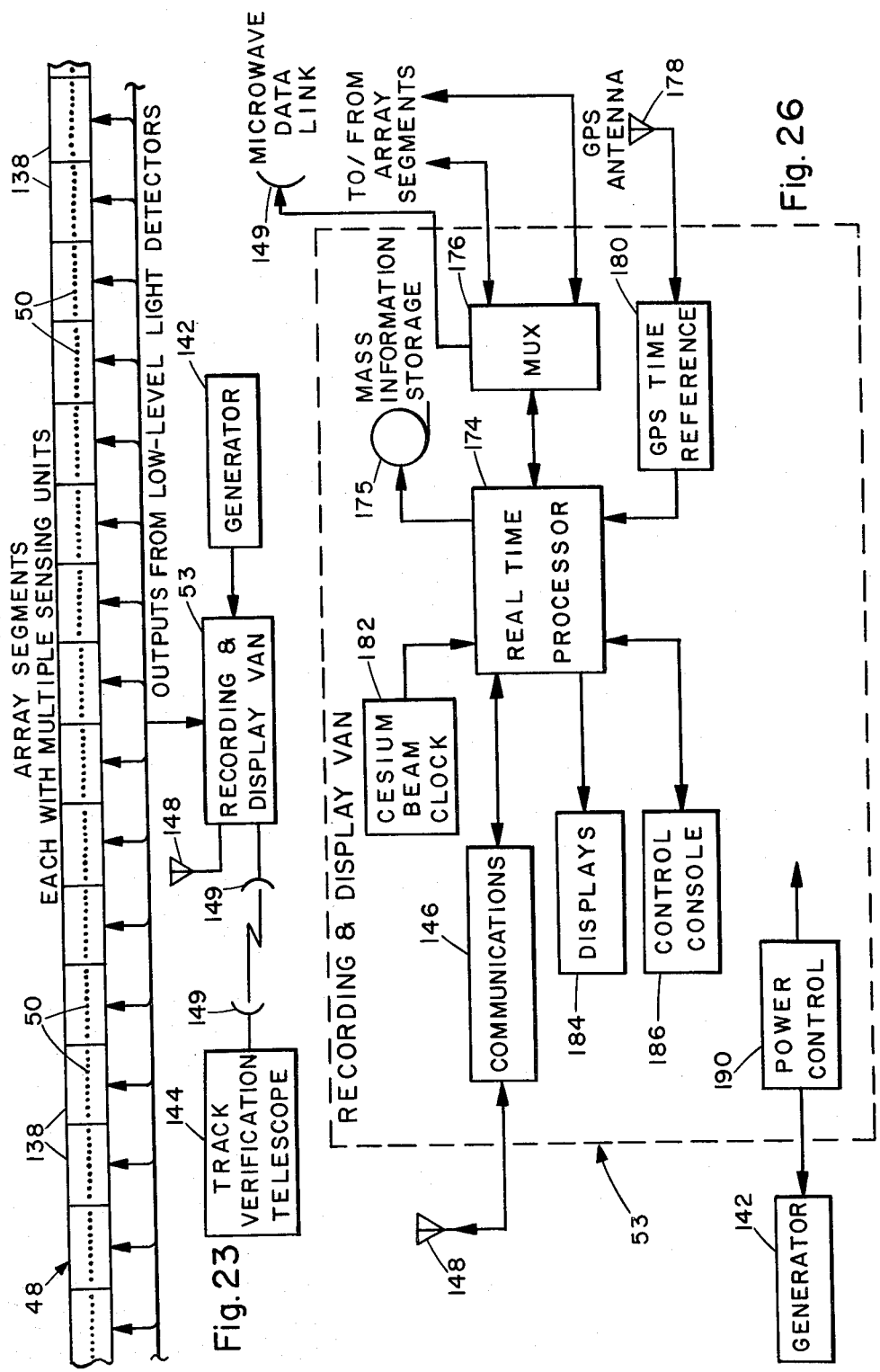

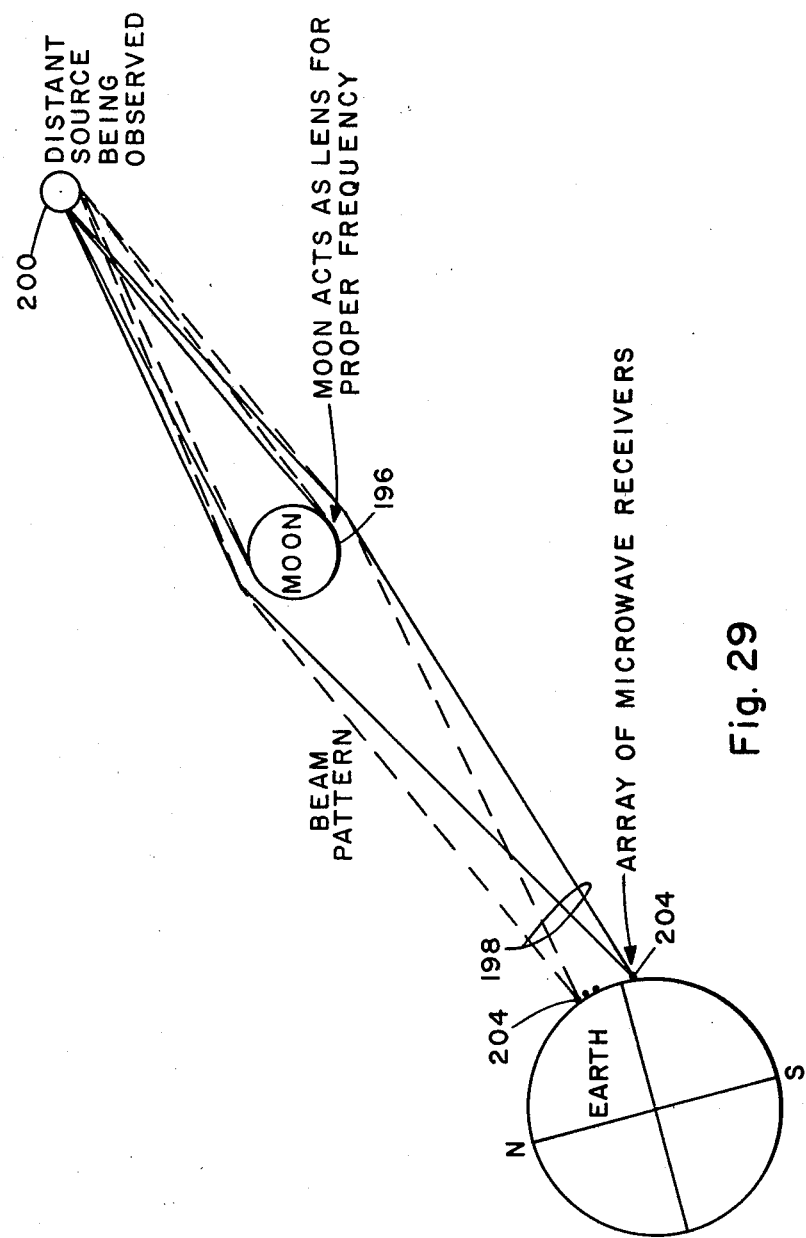

ORBITING OBJECTIVE LENS TELESCOPE SYSTEM AND METHOD

BACKGROUND OF THE INVENTION

The present invention relates to astronomical telescopes, and more particularly to a system and method for enabling the viewing of distant astronomical objects with greater resolution and/or light gathering power than that which can presently be achieved with ground-based telescopes.

Since the days of the great Italian scientist and astronomer Galileo, the resolution and light gathering power of astronomical telescopes has been continually improved. It is difficult to make lenses of the type utilized in ground-based telescopes where a lens diameter of more than about 40 inches is required. Therefore, where a telescope with great light gathering power has been desired a concave mirror instead of a lens has been used as the objective element. An example of one such reflecting telescope is located at Mt. Palomar in the State of California, in the United States of America. That telescope has a concave mirror with a diameter of approximately 200 inches.

It is difficult to increase the light gathering power of a single large mirror reflecting telescope beyond that which has already been achieved due to practical restraints. This is because a very large reflecting mirror tends to sag under its own weight when the telescope is pivoted, thus distorting its reflecting surface and imparing resolution.

Multiple mirror telescopes have been constructed in which a plurality of large reflecting mirrors are mounted symmetrically about a central axis in order to focus light into a common image. An example of a telescope of this design is located at Mt. Hopkins, in the State of Arizona, in the United States of America. That telescope utilizes six 72 inch concave reflecting mirrors. This approach could be used to achieve greater light gathering power and/or resolution than single reflecting mirror telescopes. However, it is probably not practical to use the multiple mirror approach to achieve an improvement of more than about one order of magnitude in either of these factors.

Where a telescope has been designed to maximize light gathering power it has often resulted in a telescope having lower quality resolution than telescopes having significantly less light gathering power. For example, the refracting telescope located at Lowell Observatory in the State of Arizona, in the United States utilizes a 24 inch lens yet it has better resolution than the reflecting telescope located at Mt. Palomar.

When making astronomical observations from the surface of the earth, a number of factors limit the resolution which can be achieved with conventional telescopes. Scintillation due to lack of homogenity of the vapor content of the earth's atmosphere represents a principal limitation on resolution which can be achieved. Back scattered light also impairs viewing capability. The effects of light from the sun and the moon can be minimized by making astronomical observations at the appropriate time. However, artificial man-made lighting emanating from the surface of the earth is increasingly becoming a problem. Finally, air pollution also impairs the resolution which can be achieved with ground-based astronomical telescopes.

In an effort to minimize the degrading effects of scintillation, back scattered light and air pollution, large astronomical telescopes are typically mounted on remote mountain tops. Astronomical telescopes have also been flown in jet aircraft to high altitudes, for example 45,000 feet. Recently, a complete reflecting telescope has been placed into orbit about the earth and pictures have been transmitted by RF signals to ground receiving stations. While such airborne and orbiting telescopes have resulted in greater resolution, clearly the light gathering power of such telescopes is limited. Heretofore, astronomical telescopes with very great light gathering power have been very large and heavy, making it impractical to carry them to high altitudes in aircraft or to place them into orbit about the earth.

In the May, 1980 issue of the magazine entitled "ASTRONAUTICS AND AERONAUTICS" there is briefly described on pages 65 and 66 a proposed radio telescope system employing a large orbiting Fresnel zone plate as the objective lens and a plurality of spaced apart, orbiting sensing satellites positioned at different foci of the zone plate. Another telescope system in which adjacent orbiting satellites would carry the objective lens and sensing units, respectively, is believed to have been proposed by the Jet Propulsion Laboratory (JPL), in Pasadena in the State of California, in the United States. However, details of the JPL system are not available.

SUMMARY OF THE INVENTION

It is therefore an object of the present invention to provide a telescope system having substantially greater light gathering power than conventional large astronomical telescopes.

It is another object of the present invention to provide a telescope system having substantially greater resolution than conventional large astronomical telescopes.

It is a further object of the present invention to provide a method of viewing distant astronomical objects by which resolution and light gathering power can be substantially increased beyond the levels presently achievable.

It is still a further object of the present invention to substantially eliminate the degrading effects of in the earth's atmosphere in observing distant astronomical objects from the earth's surface.

According to the present invention a large objective lens is placed in a highly eccentric orbit about the earth. The orbit and the orientation of the lens are carefully chosen so that it focuses light or other radiation from a preselected astronomical object into an image which slowly moves across the surface of the earth. A row of optical sensing units is fixed on the surface of the earth so that the image focused by the orbiting objective lens will travel substantially perpendicularly across the row during an observation. Output data generated from the sensing units may be multiplexed and fed to a real time processor which produces display signals. Each of the sensing units provides one scan line of the image being observed. The display signals are fed to a suitable display device such as a CRT or hard copy machine which produces a picture of the preselected astronomical object.

The orbiting objective lens has a substantial diameter, for example it may measure approximately 500 meters in diameter. This results in substantially greater light gathering power than that of present ground-based large astronomical telescopes. Because of the very large focal length, for example 200,000 kilometers, only a small portion of the optical path of the telescope system is in the earth's atmosphere. Thus, the effect of the earth's atmosphere on image resolution is many orders of magnitude less than in present ground-based astronomical telescopes.

The orbiting objective lens may be carried by a bicycle wheel-type supporting structure and both may be unfolded from compact cargo configurations after being placed into orbit. The lens may be a Fresnel zone plate made of suitably dimensioned rings of an opague material with suitably dimensioned open spaces there between. Alternatively, the lens may be a Fresnel lens or a convex lens made of a thin membrane of transparent plastic material. The lens is stretched and held in a plane by a combination of centrifugal forces attributable to rotation of the supporting structure and mechanical restraints provided by the supporting structure itself. Control moment gyros or small jets placed at the hub of the supporting structure are utilized to control orientation of the objective lens.

The objective lens can be designed to operate in any one of the frequency windows in the earth's atmosphere. Operation in the visual range and in various IR windows is possible because the focal distance of the lens varies according to the frequency of observation. The orbit is selected to allow the observation of selected astronomical objects over a range of focal lengths.

Each optical sensing unit may include a concave mirror having a relatively small diameter, for example, eight inches. This mirror is used to focus, onto a low level light detector, the light received over the mirror's diameter from the direction of the occultation of the object to be viewed through the orbiting lens. The detector includes a filter so that it will only pass the frequency band of the light or other radiation that will be in focus during the observation. Since the resolution size of the image formed by the orbiting lens may be several times larger than the practical size for the mirror for each sensing unit, only a fraction of the light in the image can be intercepted by each unit. However, because of the very large diameter of the objective lens the total amount of light in the image which is intercepted by all of the sensing units is still very large in comparison to conventional ground-based astronomical telescopes.

The light gathering capability of the system can be increased by adding additional rows of sensors and properly combining their output signals. Multiple rows of sensors may also be used to further reduce atmospheric scintillation effects.

The optical sensing units are preferably each spaced about one resolution element apart and are located on the earth's surface so that the image focused by the orbiting objective lens moves substantially perpendicularly across the row of sensors during the observation. The size of the resolution element depends on the size of the orbiting objective lens and the distance to the lens from the sensing units. For some lenses, such as the Fresnel Zone Plate used as a lens, this distance also determines the frequency band that is in focus for the observation.

As the image passes perpendicularly across the row of optical sensing units, each unit provides one scan line of the image. Output data from the units may be multiplexed and manipulated in a real time processor as the image passes across the row of sensing units. The processor produces display signals which are utilized to create a picture of the object being viewed.

BRIEF DESCRIPTION OF THE DRAWINGS

FIG. 1 is a simplified diagramatic view illustrating the orbital mechanics of the system and method of the present invention.

FIG. 2A is a simplified diagramatic view taken in the plane of the orbit illustrated in FIG. 1.

FIG. 2B is a simplified diagramatic view illustrating an enlarged portion of the surface of the earth and the manner in which the image focused by the orbiting objective lens travels substantially perpendicularly across the row of sensing units during an observation.

FIG. 3 is a vector diagram illustrating the factors which determine the image velocity in the plane of the earth's surface.

FIG. 8 is a table of data which shows the maximum and minimum image sizes on the surface of the earth when viewing planets in the earth's solar system with an objective lens placed in three different orbits analyzed in FIGS. 4 and 5.

FIG. 10 is a simplified elevational view, perpendicular to the plane of the lens, of a preferred embodiment of the fully deployed objective lens and supporting structure.

FIG. 11 is a simplified top plan view of the objective lens and supporting structure taken along line 11—11 of FIG. 10.

FIG. 12 is an enlarged, fragmentary view of a portion of the large outer ring of the supporting structure of FIGS. 10 and 11 showing a plurality of rim members joined end to end.

FIG. 13 is a cross-sectional view of one of the rim members illustrated in FIG. 12 taken along line 13—13 FIG. 12.

FIGS. 16 and 17 are tables setting forth data illustrating dimensions and lens characteristics of exemplary Fresnel zone plates.

FIG. 21 is a simplified, side elevational view of the lens and supporting structure in their collapsed cargo configurations and the manner in which they are coupled to a rocket booster, FIG. 22 is a front end elevational view of the collapsed lens and supporting structure taken along line 22—22 of FIG. 21.

FIG. 23 is a simplified diagramatic view of a preferred embodiment of the ground-based portion of the system of the present invention.

FIG. 24 is a simplified diagramatic view illustrating a preferred embodiment of the sensing units of the ground-based portion of the system of the present invention.

FIGS. 25A and 25B are enlarged, simplified diagramatic views of the fiber-optic portions of the sensing units illustrated in FIG. 24.

FIG. 26 is a functional block diagram of an electronic system for processing output data generated from the sensor array of FIG. 23 to produce pictures of the astronomical objects observed.

FIG. 29 is a simplified diagramatic view illustrating an alternate embodiment of the present invention in which the earth's moon is utilized as a lens for focusing a radio frequency image from a distant source onto the surface of the earth for detection by an array of microwave receivers.

DESCRIPTION OF THE PREFERRED EMBODIMENTS

Figures 4, 5:
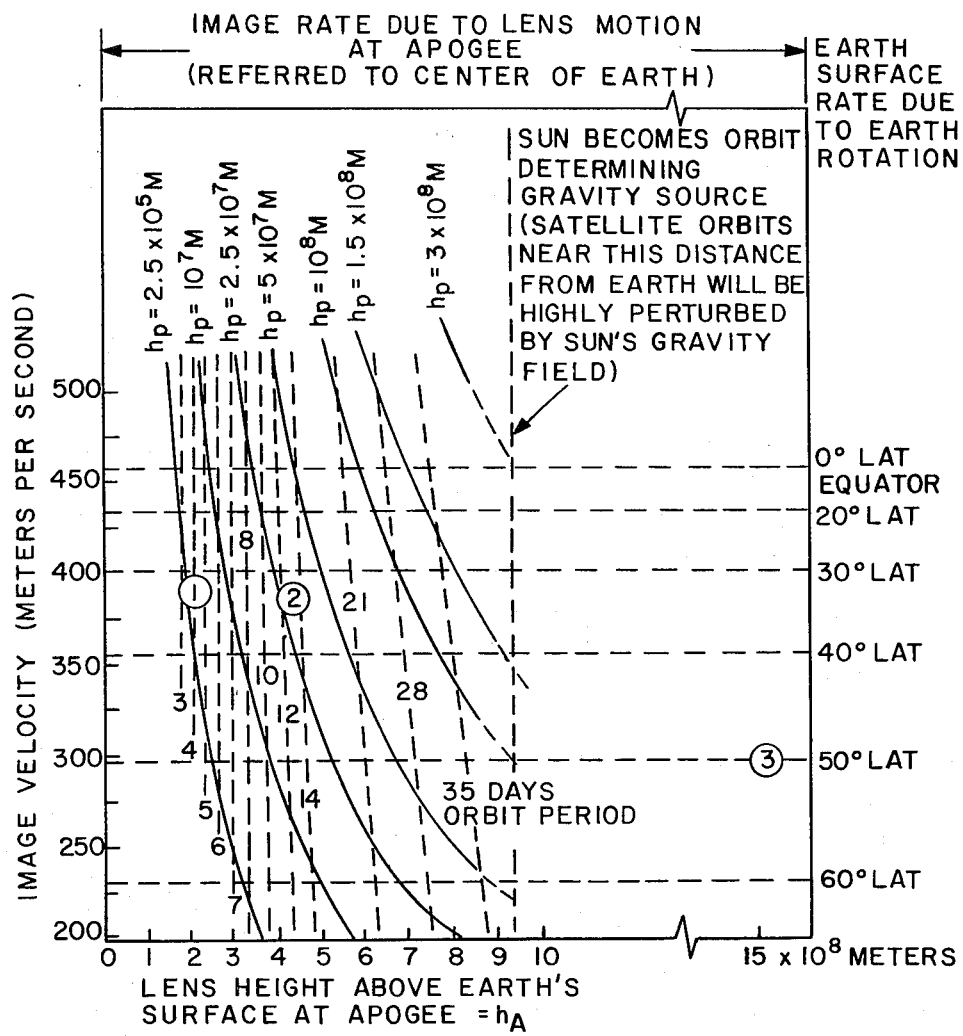
FIG. 4 is a graph depicting how the balancing of the lens orbital motion against the motion of the earth's surface due to rotation of the planet allows a low image rate over the array of sensors.
FIG. 5 is a table of data representing an analysis of three separate cases on the graph of FIG. 4.

By placing a very long focal length, large diameter lens in a carefully selected orbit about the earth and by properly controlling the orientation of the lens, images of distant stars, planets, or other astronomical objects can be focused on the surface of the earth and detected by optical sensing units. Because only a very small fraction of the optical path is in the earth's atmosphere, and because very large, very long focal length lenses are feasible, resolution can be achieved which is two or three orders of magnitude better than that which can be achieved with ground-based astronomical telescopes. Because of the very large diameter of the orbiting lens, the light gathering power of this telescope system is many orders of magnitude greater than which can be achieved through ground-based astronomical telescopes. Clouds, fog, dust or rain can prevent observations from being made with the system of the present invention. However, when atmospheric conditions permit, the pictures which are produced with the system can have a very high resolution.

The system and method of the present invention enable known astronomical objects to be viewed with greater resolution than heretofore possible. For example, it will be possible with the system and method of the present invention to ascertain details on the surface of outer planets in the earth's solar system, which details have not heretofore been recognized. In addition, the system and method of the present invention will enable astronomical objects to be viewed which have heretofore been too distant to be seen by ground-based astronomical telescopes.

In order to practice the method of the present invention, the orbit of the lens must be carefully selected so that the image will move on the surface of the earth slowly enough for sensors to detect the image with a reasonable degree of accuracy. Clearly a geocentric orbit in which the orbiting lens maintains a fixed position relative to a point on the earth's surface cannot be utilized since the line of sight from the earth to the orbiting lens would sweep through outerspace at a very high rate, making the image rate over the sensors too high to satisfactorily view most distant astronomical objects. Except for the special cases of the earth-sun libration points (opposite the earth from the sun and toward the sun from the earth), a highly eccentric orbit is desirable since it will enable relatively slow movement of the focused image on the surface of the earth (referred to herein as a low image rate). It is conceivable that by applying continuous propulsive energy to the orbiting objective lens, a sufficiently low image rate could be achieved under widely different orbit parameters. However, this technique would be impractical due to the large amount of energy which would be required to enable observations to be made over a reasonably long time period.

The system and method of the present invention will enable astronomers to search for planets around nearby stars, satellites around outer planets in the earth's solar system, and sources of radio frequency emissions, X-rays, and gamma rays. The invention may also be utilized to observe the surfaces of outer planets in the earth's solar system and the surfaces of their satellites. The invention will further enable the observation of stellar diameters, large stellar spots, comets, asteroids, and galactic configurations, and other astronomical objects.

FIGS. 1, 2, and 3 illustrate the orbital mechanics of the present invention. Referring to FIG. 1, the orbiting objective lens 30 is preferably placed in a highly eccentric orbit 32 about the earth 34. The apogee height of the orbit is indicated in FIG. 1 as $h_A$ and the perigee height of the orbit is indicated in FIG. 1 as $h_p$. The direction of orbit motion of the lens 30 and the rotation of the earth 34 are shown by arrowheads 36 and 38, respectively. Arrows 40 represent light from a star which is focused by the lens 30 to form an image 42 onto the surface of the earth. The lens 30 rotates about an axis parallel to the arrows 40. The optical path between the lens and the image is indicated by the lines 44. The distance between the lens 30 and the image 42 is the image distance of the system.

The system and method of the present invention could also be utilized for making astronomical observations from the surface of planets other than earth. However, since it is anticipated that the initial use of the invention will be in connection with earth-based observations, the system and method will be described in connection with objective lens orbiting about the earth.

The objective lens can be designed to operate in any one of the frequency windows in the earth's atmosphere. Initial operation in the visual range appears most desirable. Operation in various IR (infrared) windows may provide data which cannot be obtained from other scanning techniques. Because the focal distance of the lens will vary with frequency, an orbit should be selected that will allow observations of important objects over a range of focal lengths.

The present invention contemplates that the lens 30 (FIG. 1) will typically be very high above the earth's surface at the apogee of its orbit, for example, 200,000 kilometers. For eccentric orbits, the orbital speed near the apogee of the orbit becomes much slower than for circular orbits of the same apogee height. It is contemplated that observations with the system and method of the present invention will preferably be made when the orbiting objective lens 30 is near the apogee of its orbit. At this time, the image rate with respect to the earth's surface can be very low. For some types of lenses, such as a Fresnel Zone Plate, the focal length ($h_A$) will vary as a function of frequency across the bands to be observed for a given lens design as hereafter described. The objective lens will have a very large diameter, for example, 1,000 meters.

FIG. 2A is a simplified diagramatic view taken in the plane of the orbit 36 of FIG. 1. FIG. 2B shows an enlarged portion 46 of the surface of the earth 34 where a linear array or row 48 of optical sensing units 50 is located. As more fully described hereafter, the row of sensing units is preferably positioned on the surface of the earth so that the image 42 focused by the orbiting objective lens will travel substantially perpendicularly across the row during an observation as indicated by the arrow 52 in FIG. 2B. A recording and display van 53 receives data generated from the sensing units 50 and processes the same to produce a picture of the image. In FIG. 2A, the sensor array 48 has been located in the Northern Hemisphere of the earth. The lens orbit plane 54 extends through the center of the earth, at an angle with respect to earth's equator.

The diameter of the image 42 (FIG. 2B) formed on the earth's surface is very large. For example, it may have a radius of 5,000 meters. The actual size of the image depends upon the size of the object being viewed, the distance from the lens of the object being viewed, the distance of the orbiting objective lens from the point of projection of the image on the earth, and to a lesser extent, the focal length of the lens. Furthermore, the diameter of the image will vary somewhat during the observation period due to the variation in orbit height above the earth's surface as the lens approaches and travels past the apogee point.

FIG. 3 is a vector diagram illustrating the manner in which the image velocity in the plane of the earth's surface is determined. The vector 56, which represents the motion of the image 42 over the surface of the earth, equals the sum of the vector 58 representing motion of the surface of the earth at the point where the image is projected upon the earth due to the earth's rotation, the vector 60 representing image motion due to the angular motion of the direction of the object being viewed with respect to the center surface of the earth (neglecting the earth's rotation), and the vector 62 representing image motion due to the orbital motion of the objective lens about the earth. The vector addition illustrated in FIG. 3 determines the image rate when the objective lens is at the apogee of its orbit for an illustrative case.

The preferred orbit for the objective lens will depend upon numerous factors, including the frequency of the radiation to be focused, the distance of the object or objects to be viewed, the diameter of the lens, the type of lens, the preferred image rate on the earth's surface when the objective lens is at the apogee of its orbit, and the focal length of the lens. Other factors which determine the required orbit include the location of sensor array on the earth and the direction of the object or objects to be viewed in space. It may be necessary to account for the effects of the gravitational pull of the sun and the earth's moon on both the earth's motion and the motion of the lens in its orbit. Relatively slow motion of the image on the earth's surface permits output data from the optical sensing units 50 (FIG. 2B) to be integrated over a longer time period in order to produce a more accurate picture of the image being sent. This is particularly important when the object being observed has low aparent brightness. There are also many other minor influences on the image motion that may need to be considered. These include the effect of the earth's gravitational anomalies on the lens orbit, the influence of gravity of other planets on the orbit motion of the object being viewed, the lens orbit motion, an the earth's orbit motion. Also the factors influencing the earth's rotation have a small effect.

Based upon preselected criteria, the exact orbit can be determined utilizing well-known principles of Kepplerian mechanics. Preferably, the determination of the orbit will be accomplished with the aid of a sophisticated high speed, large memory, digital computer. Techniques for determining desired orbit and paths of travel for satellites and other spacecraft have been developed and utilized in conjunction with the placement of existing earth satellites, and in conjunction with the Voyager, Gemini and Apollo space programs. Observations made with this system may be used to refine the accuracy of these solutions.

The maximum amount of radiation from the sun which could be focused by the orbiting objective lens onto the surface of the earth is far too small to cause any danger as a result of raising the temperature of the area over which the image travels. For example, if an orbiting objective lens having a diameter of approximately one thousand feet were to focus radiation from the sun from a 10,000 mile height, the maximum image intensity of the sun that could be focused by the lens onto the surface of the earth would be less than 5 one millionths of the intensity of direct sunlight. This is due to the very large area over which the image is spread. The energy of the sun which is intercepted by the 1000 foot diameter lens at the 10,000 mile height is focused on an area which is approximately 4,060 feet in diameter. Higher orbit altitudes or smaller diameter lenses will focus even less energy. Also, with the Fresnel Lens plate type lens only a narrow frequency band of the sun's radiation is in sharp focus at any one distance from the lens. Typically, the lens will not be in an orbital position or atitude such that it will be able to focus radiation from the sun onto the earth's surface.

An eccentric orbit is chosen so that the orbital velocity of the objective lens compensates for the velocity of the surface of the earth to a degree that the speed of the image across the surface of the earth is relatively slow. Referring to FIG. 4, there is shown a graph illustrating how the balancing of the lens orbital motion against the motion of the earth's surface due to rotation of the planet allows a low image rate over the array of sensors. The graph of FIG. 4 gives velocity data which applies to lens orbits of interest. In FIG. 4 apogee height ($h_A$) and perigee height ($h_P$) are expressed in meters above the surface of the earth. Also the effect of angular motion of the direction of the object to be observed with respect to the center of the earth (which is usually small) is neglected. With this approximation the preferred direction of the lens orbit motion at apogee to cause image motion at the sensor location on the surface of the earth to be in the same approximate direction as the sensor location motion due to the earth's rotation, the orbit motion of the lens is controlled so that the latus rectum of its orbit is substantially in the equatorial plane of the earth and perpendicular to the earth's meridian plane that will pass through the sensor location and the direction to the object to be viewed at the time the lens is at apogee. The latus rectum of lens orbit is a line passing through the plane of the orbit of the lens and the center of the earth that is perpendicular to a line drawn between the apogee and perigee points on the orbit all defined in inertial space. The plane of the lens orbit is established so that the direction of the object to be viewed at the time the lens reaches apogee passes from the sensor location through the lens orbit apogee point. FIG. 4 shows the approximate relationship between apogee and perigee heights and magnitude of image motion velocity at apogee due to the lens orbital motion for several values of perigee heights. Also the magnitude of the velocity of the sensor location motion due to earth rotation for a range of sensor location lattitudes is shown. In addition the approximate orbit periods are shown. When repeated observations of the same object are desired it is desirable to establish orbit periods that are integral numbers of days (measured in 24 hour sidereal time). By proper orbit design the desired combination of apogee height, apogee velocity and orbit period may be selected within a reasonable range of performance.

In order for the image rate at the sensor location to be desirably low the image rate in both magnitude and direction due to the lens orbit motion (corrected for the image motion due to the change in direction of the object being viewed with respect to the center of the earth) must be made very nearly equal to the motion of the sensor location due to earth rotation.

Referring to FIG. 2A, the latus rectum for the orbit shown is a line extending perpendicularly from the page, contained within the earth's equatorial plane and passing through the center of the earth.

The data in the graph of FIG. 4, applies to a first family of orbital planes extending through the latus rectum at various angles with respect to the plane of the equator, and to a second family of such orbital planes generated by rotating the latus rectum relative to the North-South rotational axis of the earth. Canting of the orbital plane with respect to the equatorial plane, and rotation of these orbital planes about the earth's rotational axis, enables astronomical objects in nearly any direction to be observed from different points on the earth's surface.

By way of example, in FIG. 4, if the objective lens is placed in an orbit so that its height above the earth's surface at apogee equals approximate $2 \times 10^8$ meters and it's height above the earth's surface's at perigee equals approximately $1.5 \times 10^6$ meters then its orbit period is approximately four days, and the image focused by the objective lens will be traveling at approximately 360 meters per second relative to the surface of the earth (neglecting the earth's rotation) in a generally easterly direction. This speed is approximately equal to the magnitude of the velocity at the surface of the earth at forty degrees north or south latitude.

The table of data depicted in FIG. 5 refers to cases one, two and three indicated on the graph of FIG. 4 which have been selected for analysis. Case three corresponds to the libration point opposite the earth from the sun or the libration point between the earth and the sun. Observations are normally made when the objective lens is at or near the apogee of its orbit at which time the apogee substantially equals the focal distance of the lens. In cases one and two analyzed in the table of FIG. 5, the effects of lunar and solar gravity have been neglected in the orbital computation. However, these effects have been taken into account in determining the data given for case three.

Figure 6:
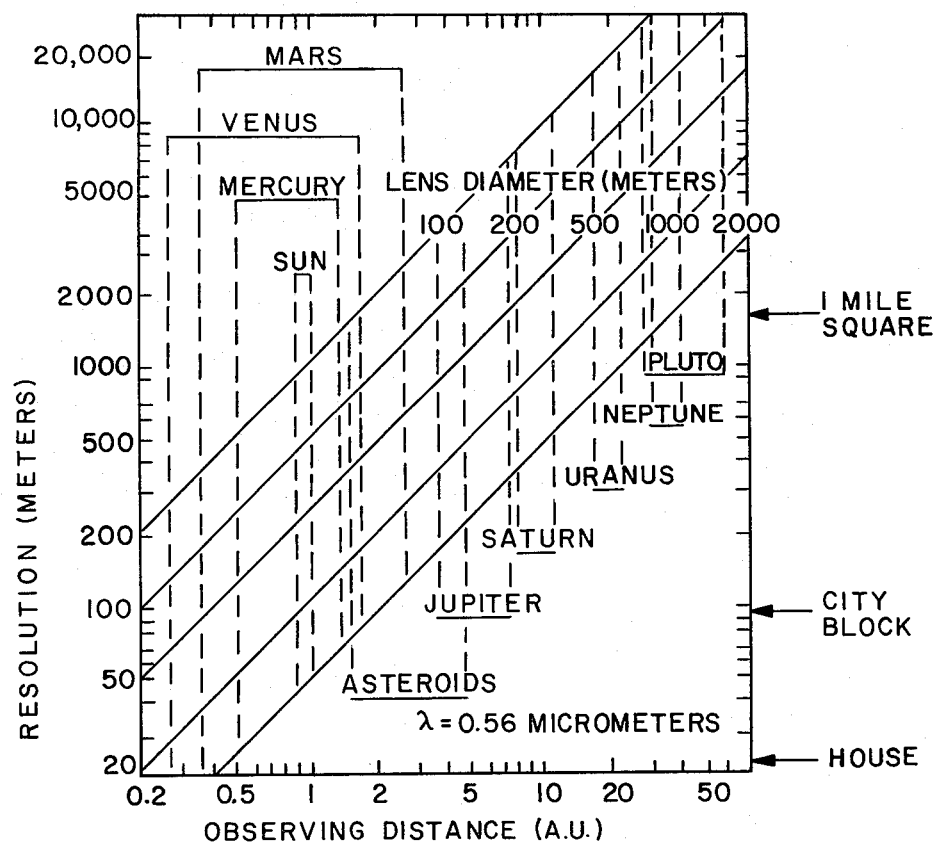
FIG. 6 is a graph illustrating the diffraction limitation of resolution in viewing planets in the earth's solar system at a visible frequency of light.

FIG. 6 is a graph illustrating the diffraction limitation of resolution in viewing planets in the earth's solar system for light near the center of the visual range, i.e., a wavelength lamda equaling approximately 0.56 micrometers. The units A. U. on the horizontal scale are Astronomical Units, each of which equals the approximate distance from the earth to the sun. The diffraction limitation of resolution is the theoretical limit of sharpness of the picture which can be achieved with perfect optics. By way of example, the data illustrated graphically in FIG. 6 indicates that if the orbiting the objective lens has a diameter of approximately 1,000 meters, an object on the surface of Mercury measuring slightly more than 50 meters in diameters could be resolved and distinguished from a similar object of the same size some 50 meters distant when the planet Mercury is at its closest point to the earth, approximately 0.5 astronomical units away from the earth. This statement neglects the fact that the sun direction is nearly in the same direction as the planet mercury at nearest approach and would interfere with observing the surface of the planet. Also the side of the Mercury toward the earth is not lighted by the sun. Thus a practical observation is not possible at this time. The direction of Mercury is close to the direction of the sun at the time it is furthest from the earth. However if it could be properly observed at this time with the same lens an object on the surface of Mercury measuring approximately 150 meters in diameter could be resolved and distinguished from a similar object of the same size separated by 150 meters distance on the surface of Mercury when Mercury is at its farthest point from earth, approximately 1.5 astronomical units away from the earth.

Figure 7:
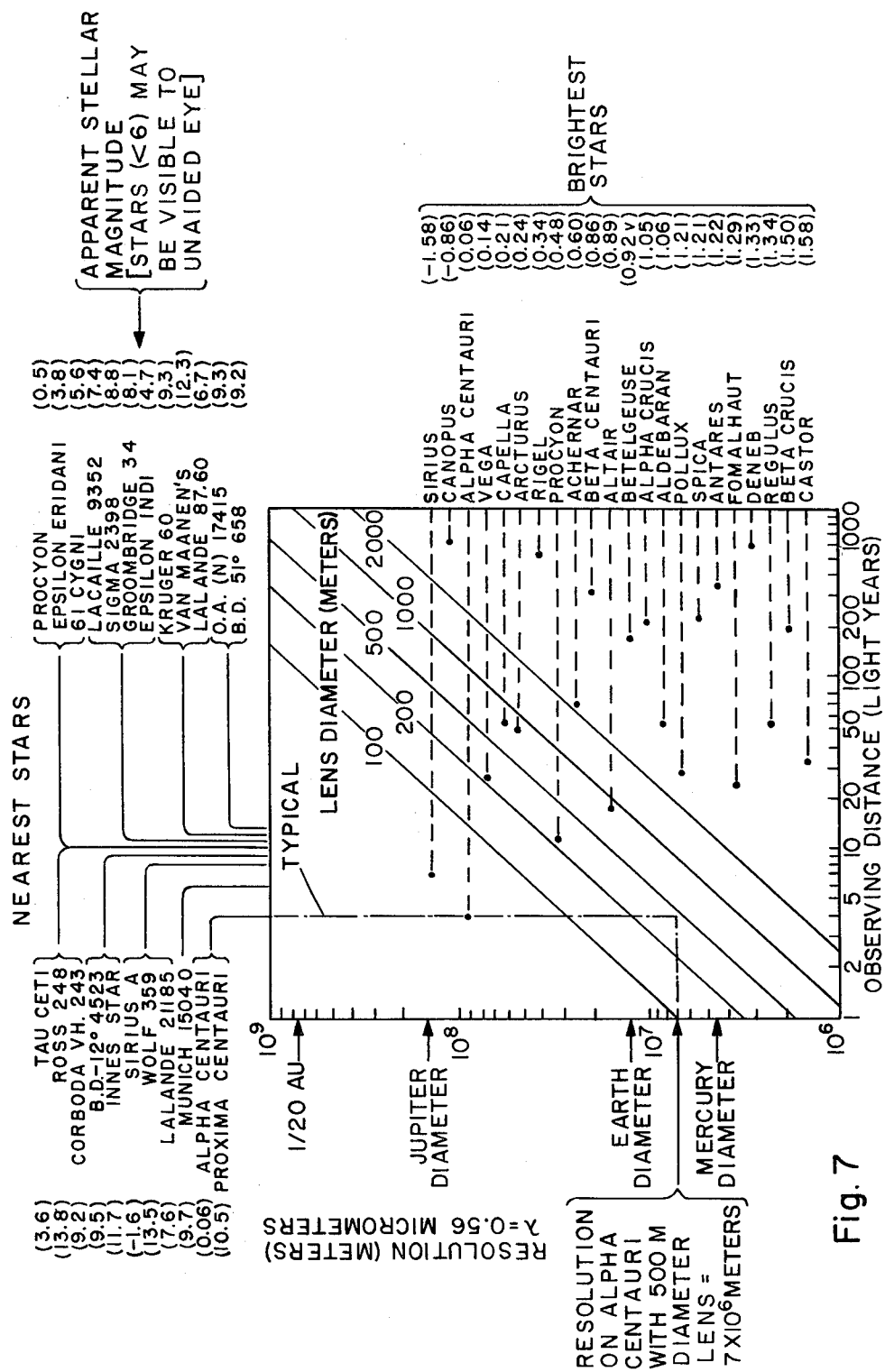
FIG. 7 is a graph illustrating the diffraction limitation of resolution in viewing stars at a visible frequency of light.

FIG. 7 is a graph illustrating the diffraction 30 limitation of resolution in viewing stars where $\lambda = 0.56$ micrometers. By way of example, the data illustrated graphically in FIG. 7 indicates that if the orbiting objective lens has a diameter of approximately 500 meters, then visible features on the star Alpha Centauri, for example, sunspots, measuring approximately $7 \times 10^6$ meters could be resolved. The graph of FIG. 7 indicates the observing distances in light years of the brightest stars are the right of FIG. 7. The observing distance of the nearest stars are shown at the top of FIG. 7. The vertical scale of FIG. 7 gives the resolution for the observing distances indicated for several lens diameters.

FIG. 8 is a table of data which shows the maximum and minimum image sizes on the surface of the earth when viewing planets in the Solar System when the objective lens is placed in three different orbits namely cases one, two and three referred to in FIGS. 4 and 5. Case 3 is not expected to be useful for viewing planets.

Figure 9:
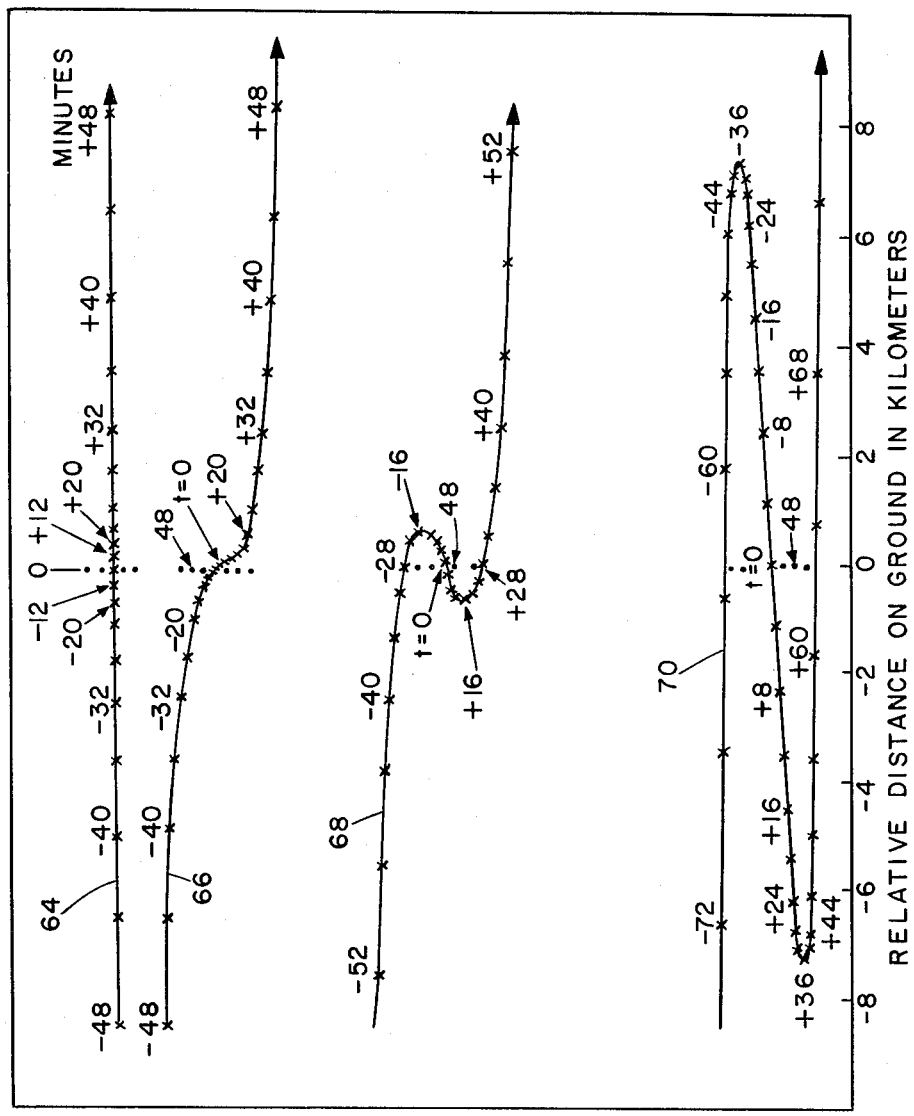
FIG. 9 is a graph illustrating typical ground tracks of the center of the image focused by the objective lens onto the surface of the earth which can be produced by selecting the appropriate orbit for the lens and location for the sensor array.

FIG. 9 is a graph illustrating typical ground tracks of the center of the image on the surface of the earth which can be produced by selecting the appropriate orbit for the objective lens and the appropriate location for the sensor array. The horizontal scale on the graph represents relative distance on the ground in kilometers. Each of the four tracks 64, 66, 68 and 70 has indications thereon at scale locations indicating minutes before (negative) and minutes after (positive) passing across the point t=0, which corresponds to the apogee time for the lens and the time when the object being viewed passes through the meridian plane containing the sensor array. Preferably the sensor array 48 (FIG. 2B) intersects the position of the image at t=0 and extends vertically in FIG. 9 so that the image crosses the row of optical sensing units 50 (FIG. 2B) substantially perpendicularly to the row.

In FIG. 9, the time markings on the ground tracks are referenced to the image line traced by the image center passing through the meridian plane coinciding with the sensor array. In connection with the ground track 64, the image velocity equals the surface velocity at t=0. Thus, the image momentarily stops with respect to the sensor array. In connection with the ground track 66, the image velocity magnitude also equals the surface velocity magnitude at t=0. However, the directions of the two velocities are slightly different so that the image is seen by the sensor array as traveling from tne Northwest to the Southeast as it crosses the array. In connection with the ground track 68, the magnitude of the image velocity is slightly greater than the magnitude of the surface velocity at t=0 and the directions of the two velocities are slightly different at t=0. In connection with the ground track 70, the magnitude of the image velocity is even greater than the magnitude of the surface velocity at t=0 than in the case of the ground track 68, and in addition the two velocity directions are slightly different at t=0. In the case of the ground track 68 and 70, the image makes three separate passes over the meridian plane once before t=0, at t=0 and once after t=0. Thus, if the sensor array 48 is located in line with the aforementioned meridian plane, the image or portions thereof can be sensed during three separate passes.

The orbiting objective lens may be carried by a bicycle wheel-type supporting structure 72 which is shown in simplified form in FIGS. 10 and 11. The objective lens 30 and the supporting structure 72 are preferably unfolded from compact cargo configurations after being placed into orbit. The lens is stretched and held in a plane by a combination of centrifugal forces attributable to rotation of the supporting structure and mechanical restraints provided by the supporting structure itself. The deployed lens and supporting structure are sometimes collectively referred to herein as the "satellite structure." Control moment gyros or small jets placed at the central hub 74 of the supporting structure are utilized to control orientation of the objective lens so that the same can be directed to enable the viewing of different astronomical objects. The objective lens is preferably oriented so that its plane is substantially perpendicular to the incoming rays of radiation from the object being viewed.

As explained more fully hereafter, when the lens 30 and the supporting structure 72 are in their compact cargo configurations, they may be stowed in the cargo bay of a Space Shuttle such as the Enterprise. The loaded space shuttle may be launched from the surface of the earth into a low orbit. Thereafter, the lens and supporting structure may be ejected from the cargo bay and a suitable rocket booster may be utilized to propel the lens and supporting structure into the predetermined highly eccentric orbit.

As shown in FIG. 11, the objective lens may comprise a Fresnel zone plate made of rings (black in FIG. 11) of an opaque material such as very thin aluminized material such as that sold under the trademark KAPTON with suitably dimensioned open spaces (white regions in FIG. 11) there between. The design parameters for Fresnel zone plates are well known. The areas of each of the opaque rings are equal and the central opaque disc has an area equal to that of the rings. A zone plate can easily be drawn by tracing concentric circles with radii proportional to the square roots of whole numbers and then by blackening or making opaque every other ring. Essentially, the opaque rings block off the light or radiation of every other zone. Analysis of the optics of a Fresnel zone plate confirms that they are capable of focusing light or other radiation from an object to an image over a predetermined focal length. A discussion of Fresnel zone plates may be found in the book CONCEPTS OF CLASSICAL OPTICS by John Strong, published in 1958 by the W. H. Freeman and Company beginning at page 187, and in the book FUNDAMENTALS OF OPTICS by Francis A. Jenkins and Harvey E. White, 3rd edition, published by McGraw-Hill Book Company, Inc. in 1957, beginning at page 360.

The supporting structure and the objective lens are adapted to be unfolded from compact cargo configurations to deployment configurations in which the lens is placed into a substantially planar shape by a combination of centrifugal forces and mechanical restraints. The central hub 74 (FIG. 10) has a central axis 76. An upper central support post 78 is extendable axially away from the hub 74. A lower central support post 80 is also extendable axially away from the hub 74. A plurality of rim members 82 (FIG. 12) are connected in end to end fashion to form a ring 84 (FIGS. 10 and 11) which is expandable from a folded configuration adjacent the hub 74 to an unfolded configuration in which the members form a ring spaced from, and extending around the central axis 76.

A plurality of stays 86 (FIGS. 10 and 11) extend radially between the upper post 78 and the ring 84 and also between the lower post 80 and the ring 84 when the supporting structure and the lens are in their unfolded deployment configurations. The outer stays to maintain the hub 74 in concentric relationship with the ring 84. When the supporting structure and lens are in their folded compact configurations the outer stays 86 are also folded and are later tightened or tensioned when the satellite structure is placed in its deployment configuration and rotated.

The rim members 82 have a square-shaped cross section (FIG. 12). When the supporting structure is in its compact cargo configuration the rim members are folded flat and are later expanded when the supporting structure and lens are unfolded into their deployment configurations. The rim members 82 are preferably made of composite resin and graphite material which may have a thickness of, for example, approximately 0.041 centimeters. This material has an excellent strength-to-weight ratio and can withstand the degrading effects of micrometers and ultraviolet radiation in outer space for a sufficiently long time period.

As shown in FIG. 12, the stays 86 are connected to the flexible couplings 90 which connect adjacent ends of adjacent rim members. The rim members may measure, for example, approximately 0.22 meters on the diagonal as shown in FIG. 13.

Figure 14:
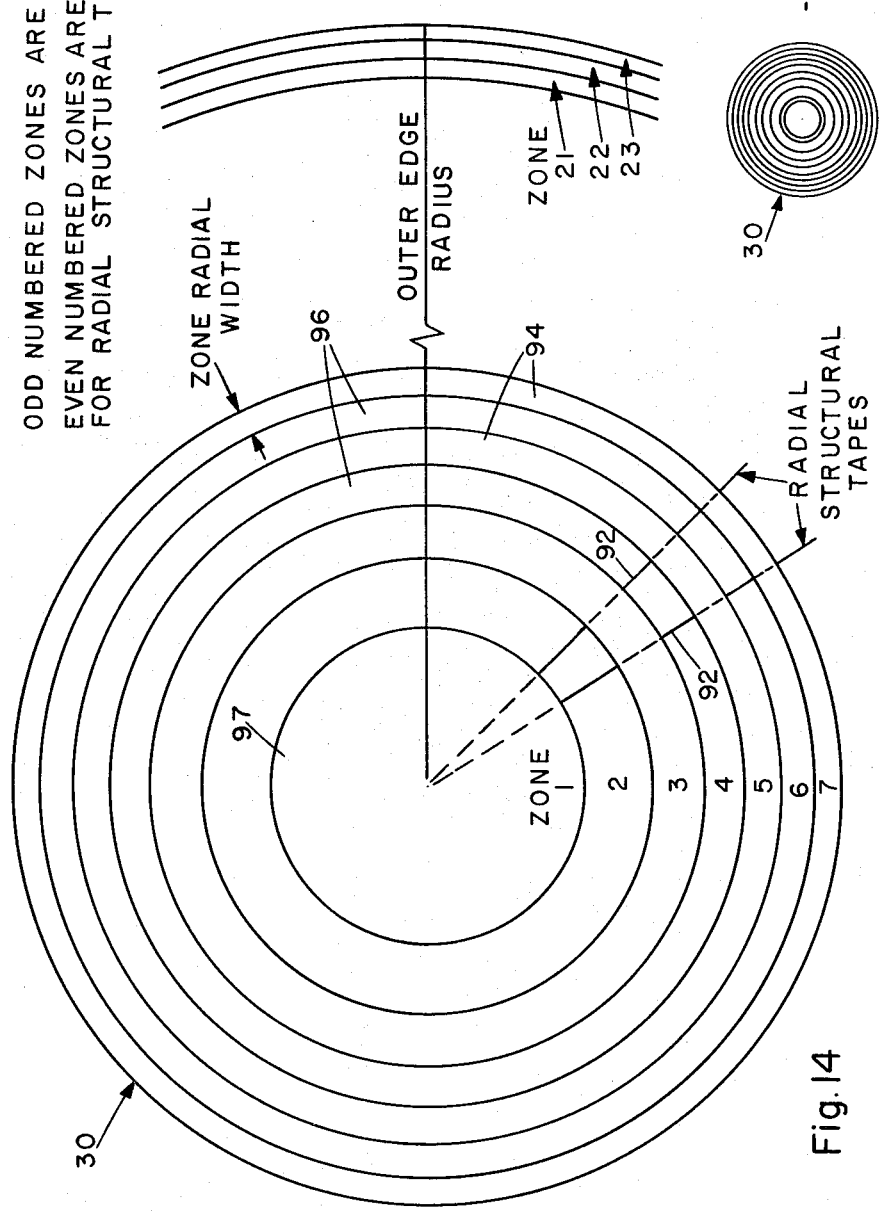
FIG. 14 is an enlarged, simplified fragmentary view illustrating the construction of a Fresnel zone plate which may be utilized as the objective lens.

Referring to FIG. 14, there is shown therein a portion of the Fresnel zone plate which may comprise the objective lens element 30 (FIG. 11). A plurality of radially extending tapes such as 92 extend from the hub 74 and hold the opaque rings 94 in their precise spaced apart locations when the supporting structure is rotated in outer space. The open spaces are indicated with the reference number 96 in FIG. 14. The tapes may be made of a composite material such as graphite epoxy.

In the example of the satellite structure illustrated in FIG. 10-14, the diameter of the lens may be approximately 500 meters, the distance between the remote ends of the upper and lower posts 78 and 80 (FIG. 10) may be approximately 184 meters. There may be approximately 200 rim members each measuring approximately 7.85 meters in length. There may be approximately 200 rim stays 86, each measuring approximately 266.7 meters in length. The rim stays from the upper and lower support posts may be alternately attached to the flexible couplings 90 (FIG. 12) between the rim members. The Fresnel zone plate 30 may have a total of 558 zones, 279 of which are opaque and 279 of which are open. The area of each such zone may be approximately 351.86 square meters. The satellite employs the so-called hoop-column structural system which enables it to be spun around the central axis 76 in order to stabilize the concentric opaque Fresnel zones. The foregoing dimensions for the opaque Fresnel zones enable the lens to operate effectively at a frequency of $\lambda = 0.56$ micrometers, which is the approximate wavelength for light in the visible spectrum. The stays 84 and 86 are preferably made of small gauge wire made of a material which is light in weight, and high in strength and low in temperature coefficient.

Figure 15:
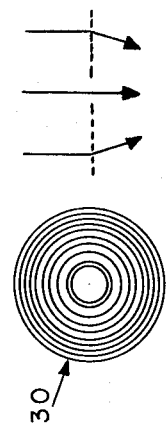
FIG. 15 is a reduced, simplified plan view of an alternate form of Fresnel zone plate which may be utilized as the objective lens.

The Fresnel zone plate may have a central open region as shown in FIG. 15. FIGS. 16 and 17 set forth data illustrating dimensions and lens characteristics of exemplary Fresnel zone plates The Fresnel zone plate has a number of advantages over a conventional lens. First of all, it does not require thickness control. In other words, the rings 94 (FIG. 14) of opaque material may all have the same thickness and the thickness may vary with little effect. Furthermore, since the Fresnel zone plate has large open spaces it takes up less space when it is folded into a compact cargo configuration than does a conventional lens. A conventional convex lens requires thickness control which is especially acute when considering the very large diameters involved. For example, a convex lens which may be utilized in the present system may have a thickness at its center of approximately one hundredth inch and may gradually decrease in predetermined precise fashion to a thickness of approximately one thousandth of an inch at the periphery of the lens. Manufacturing such a very large lens with the precise thickness required for reasonably good optical performance may pose significant problems.

The Fresnel zone plate can be made of opaque rings which are very thin, for example a few hundredths of an inch thick, making them very light weight for their diameter. Since the rings are opaque, they may be easily protected from ultraviolet radiation and micrometeors by coatings. Such coatings are difficult to use in connection in the conventional lens since they may interfere with the necessary transparency. The Fresnel zone plate is useful over a large bandwidth from the ultraviolet through the radio range. The rings of opaque material may be reinforced with high-strength, low-temperature composite cords.

The Fresnel zone plate also has a number of disadvantages. Its focal length is a function of its wavelength. This limits the frequency band which is in focus at a given focal distance. Transmissibility of inband energy is more limited than with a convex lens. Furthermore, it may be difficult to resolve a dim object near a bright object with a Fresnel zone plate. A reduction of the open space may be an adequate solution to this last problem. In order for the image to be in focus on the surface of the earth the following equation must be approximately satisfied:

$$1/s + 1/s' = 1/f$$

where:
s = the distance from the astronomical object being observed and the orbiting objective lens, called the object distance.
s' = the distance from the orbiting objective lens and the location on the surface of the earth where the image is to be in focus 42, called the image distance.
f = the focal length of the orbiting objective lens.

This equation is often called "the lens formula" and is found in most basic optical texts. Here it is applied to the orbiting objective lens system.

Even though the apogee height of the orbiting objective lens approximates the distance s' and is many times the diameter of the earth, the distance s is many times greater than s' for nearly all astronomical objects expected to be observed.

For those astronomical objects outside the Solar System the ratio of s to s' is very large. This means that s' must be very nearly equal to the distance f for these objects to be in focus on the surface of the earth.

For most astronomical objects in the Solar System expected to be viewed s' will need to be slightly longer than f to satisfy the equation for sharp focus.

The focal length f of the orbiting objective lens is established by the design of the lens. For the case of the Fresnel Zone Plate used as a lens and the Fresnel Lens the focal length if approximately proportional to the frequency of the light passing through it.

This means that an image formed with this type lens can only be in sharp focus over a narrow band of optical frequencies. In order to achieve a sharp image with either of these types of lenses an optical bandpass filter (160 in FIGS. 24 and 25A) is placed in the sensing system ahead of the low-light detectors. By choosing an optical bandpass filter with proper center frequency and suitable bandwidth all the light passing through to the low-light level detector will form a sharp image at one focal length as determined by the lens design and the center frequency of the filter. The filter eliminates light at the frequencies that are not in focus. This improves the image quality that can be obtained in the observation.

The choice of another optical bandpass filter centered at another frequency will result in an observation in a different color and result in a different focal distance for a sharp image when Fresnel Zone Plates or Fresnel Lenses are used as Orbiting Objective Lenses. Thus there is a choice of trimming the orbit or trimming the optical frequency to obtain the sharpest image. In any event the orbit design must be compatable with the lens focal length for the sharpest image to be observed.

Other types of lenses can be utilized in which the focal length is less (possibly even a negligably) a function of the optical frequency over the frequency range to which the System will respond. With such lenses the optical bandpass filter is not required to maintain focus but may still be useful for separating out different colors to be recorded for later observation and analysis and/or for near real time observation.

The objective lens 30 also may be a Fresnel lens, a segmented foldable lens, or a convex lens made of a thin membrane lens made of suitable transparent plastic material. The membrance must be dimensioned in thickness for focusing radiation of a preselected bandwidth from the astronomical object into an image on the surface of the earth. The transparent convex lens has several advantages over a Fresnel zone plate. The convex lens passes a maximum amount of light. Its very large focal length to lens diameter ratio results in low chromatic distortion. Also, the very long focal length required which is determined by the highly eccentric orbit results in a very thin lens which can be folded into a compact cargo configuration and later stretched into a substantially planar deployment configuration by rotation about an axis perpendicular to its plane.

Figure 18:
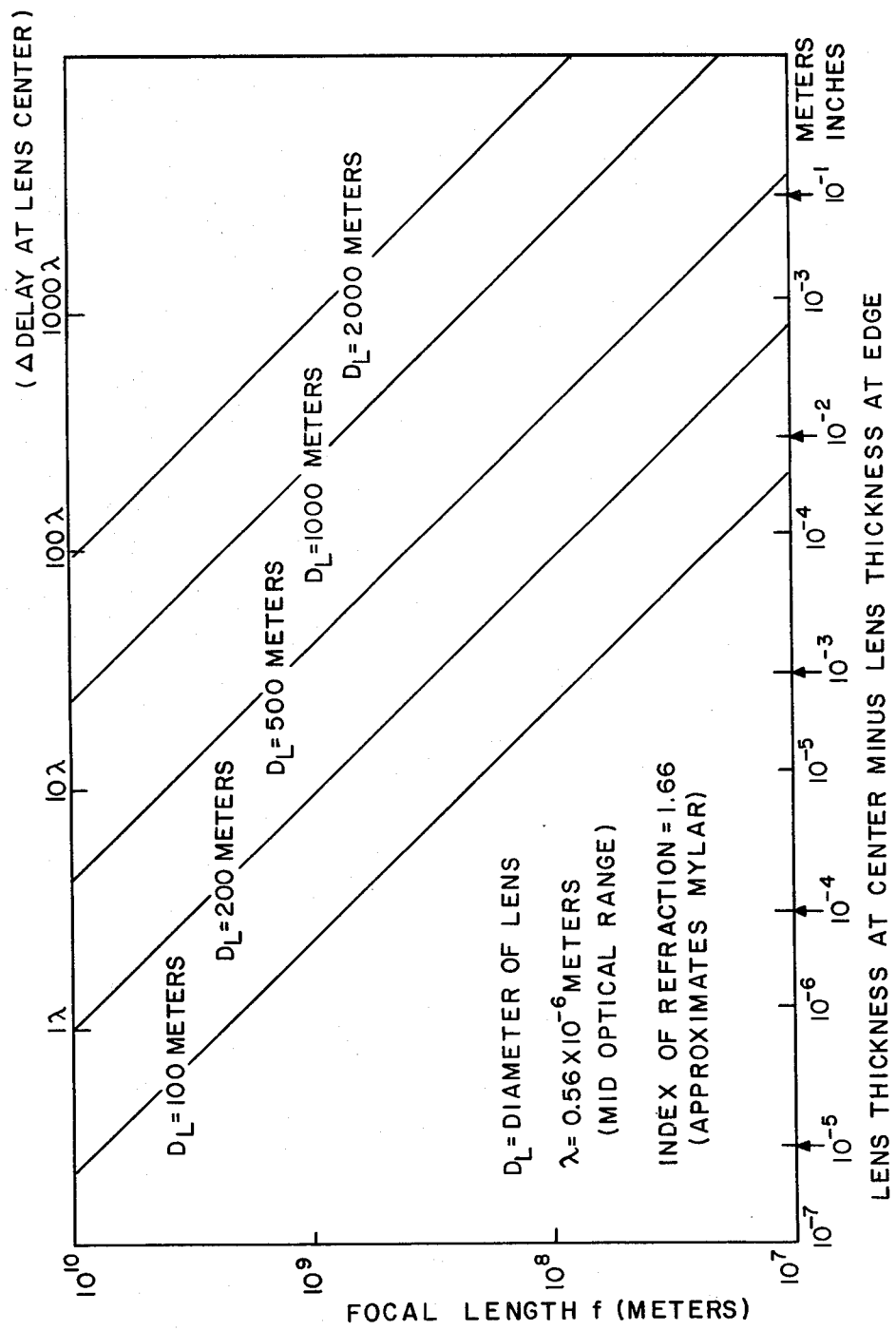
FIG. 18 is a table setting forth data illustrating the variation in lens thickness which is required for a typical convex lens made of plastic membrane to be used as the objective lens in the system of the present invention.

The graph of FIG. 18 illustrates the variation in lens thickness which is required in utilizing a convex lens made of a plastic membrane in the system of the present invention. One possibly suitable material for the lens is sold under the trademark MYLAR and has an index of refraction of approximately 1.655. By way of example, the graph of FIG. 18 indicates that for a convex lens having a diameter of approximately 100 meters to be utilized in the system of the present invention where the observation is to be made over a focal length of $2 \times 10^8$ meters (representing an apogee height of approximately 200,000 kilometers) the thickness differential between the center of the lens and the periphery of the lens would be less than 1/100 of an inch for a 500 meter diameter lens. The foregoing example applies for a wavelength of approximately $0.56 \times 10^{-6}$ meters (mid optical range) and for a material having an index of refraction of approximately 1.655 which approximates the index of refraction of MYLAR brand plastic.

The primary difficulty of utilizing a convex membrane lens is that the extremely small variation in thickness from the center of the lens to the periphery of the lens must be precisely controlled and maintained. Furthermore, the lens cannot be covered with a protective coating of an opaque material since it must maintain transparency. Therefore, the plastic material may degrade as a result of exposure to ultraviolet radiation. Furthermore, the lens may become foggy over a period of time due to micrometeors.

Figure 19:
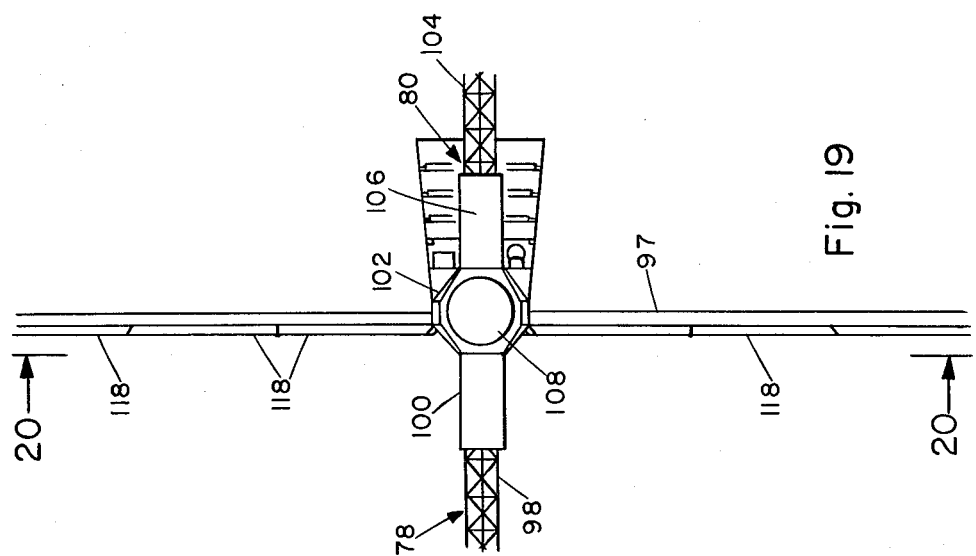
FIG. 19 is a simplified view of a preferred embodiment of the deployed central hub of the structure which supports the objective lens.
Figure 20:
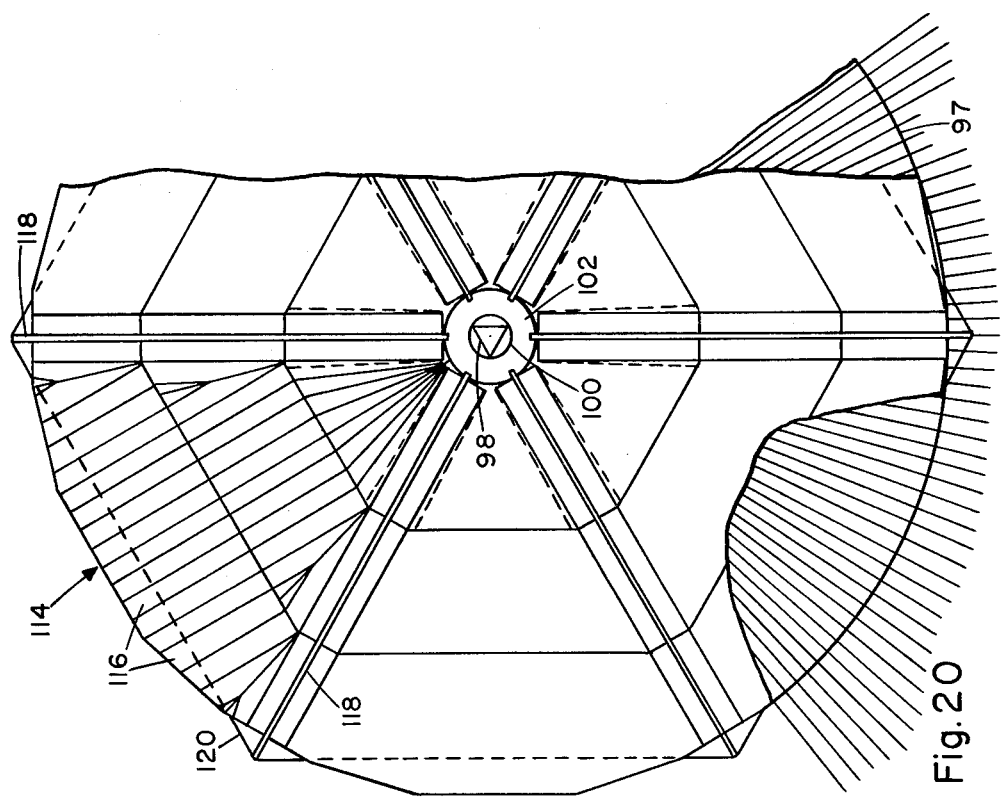
FIG. 20 is a fragmentary top plan view of the deployed hub taken along line 20—20 of FIG. 19.

FIGS. 19–22 illustrate details of a preferred embodiment of the central hub 74 of the bicycle wheel-type structure (FIGS. 10 and 11) which supports the objective lens 30 in its planar deployment configuration. In FIGS. 19 and 20, the central opaque circle 97 of the zone plate 30 is visible. The upper post 78 (FIG. 19) includes a first astromast 98 (FIG. 19) which is extendable from a first astromast canister 100 whose one end is connected to one side of a central fuselage 102. The lower post 80 (FIG. 10) includes a second astromast 104 (FIG. 19) which is extendable from a second astromast canister 106 whose one end is connected to the other side of the fuselage 102.

A spherical propellant tank 108 (FIG. 19) is mounted within the fuselage 102. It is utilized to contain pressurized liquid rocket fuel such as liquid argon which is ionized in ion thrusters 110 and 112 (FIG. 21). These thrusters are utilized to change the attitude or orientation of the lens for viewing different astronomical objects or repetitive viewing of the same object. They are also utilized to maintain or change the orbit of the objective lens over a long period of time. In the planned design shown in FIGS. 19 through 22, the propellant tank 108 is designed to carry enough fuel to allow changes in the orientation or orbit of the objective lens to be made every two weeks over a seven year period. The ion thrusters may be pivoted about the central axis 76 (FIG. 10) to enable attitude adjustment of the orbiting objective lens and satellite support structure.

The ion thrusters 110 and 112 are highly efficient, however, they provide relatively low thrust. For example, in the prototypes actually designed they may have a thrust of approximately 0.15 pounds. By continuously operating the ion thrusters over a long period of time, it is possible to change the orbit of the objective lens to permit different astronomical objects to be viewed.

Electric power necessary for operating the ion thrusters 110 and 112 as well as other on-board equipment is generated by a generally hexagonal-shaped array 114 (FIG. 20) of photovoltaic panels 116 supported by six radially extending beams 118 extending from the fuselage 102 (See FIGS. 19 and 20). The photovoltaic array 114 and the beams 118 which support the same are designed to unfold from a compact cargo configuration shown in FIG. 22 to a deployed configuration shown in FIG. 20. Each of the photovoltaic panels 116 (FIG. 20) has a generally triangular shaped configuration and is supported between, and spaced from adjacent ones of the beams 118 on lightweight wires such as 120. The beams 118 which support the photovoltaic panels 116 may have a telescope construction so that they can be extended from a compact arrangement shown in FIG. 22 to an extended deployed arrangement shown in FIG. 20.

Further details of the structure of the central hub 74 are visible in FIGS. 21 and 22. Coupled to one end of the fuselage 102 is a frusto-conically shaped radiator 122 for dissipating solar heat. One end of the radiator 122 is releasably attached by a coupling assembly 124 to the forward end of a large cylindrical rocket booster 126. This booster pushes the supporting structure 72 and the lens 30 into a high eccentric orbit about the earth after the apparatus has been unloaded from the payload bay envelope of the space shuttle. After the launch vehicle delivers the orbiting lens and its associated booster into low earth orbit the booster is used to propel the lens into its required highly elliptical orbit. One suitable booster for this function is the CENTAUR D-1 S manufactured by General Dynamics Corporation, Convair Division, located in San Diego in the State of California, in the United States.

Once the coupled rocket booster and satellite support structure have reached their predetermined orbit, onboard attitude control rockets on the CENTAUR booster may be fired to spin the hub in order to deploy the objective lens and supporting structure. Spinning of the hub 74 causes the rim members 82 (FIGS. 21 and 22) and the lens which are stowed adjacent the fuselage and extend axially thereof, to be pulled radially outwardly from the hub like a blossoming flower as a result of the centrifugal forces which are generated. Only a portion of the stowed rim members have been shown in FIG. 22 for the sake of clarity. They are stowed side by side, adjacent the hub in the form of a concentric cylinder surrounding the folded lens. Continued rotation of the hub by the CENTAUR booster causes the rim members to eventually form the ring 84 (FIG. 11). At the same time the stays 86 (FIG. 10) and the photovoltaic array 114 (FIGS. 19-22) are deployed. The stays 86 are stowed in housings 128 and 130 (FIG. 21) mounted on the remote ends of the astromast canisters 100 and 106, respectively. The objective lens 30 (FIGS. 21 and 22) is folded in a compact cargo configuration adjacent the hub when the satellite is being placed into orbit and is unfolded and deployed into a substantially planar configuration as the satellite structure is spun by the booster.

A parabolic strobe light assembly 132 (FIGS. 21 and 22) is mounted to the forward end of the hub 74 immediately forward of the ion thruster 112. This strobe light assembly is normally pointed toward the earth and aids in visual sighting of the satellite structure. During the actual observation, the strobe light may be reduced in amplitude or turned off. It may be desirable to allow the strobe to operate at full intensity during the observation and to blank it out of the data electronically.

The satellite further includes propellant reliquefaction equipment 134 (FIG. 21). The necessary avionics, communications, guidance and navigation equipment are located in an electronics housing 136. In FIG. 21, the box in phantom lines which surrounds the coupled satellite and booster represents the cargo bay of a suitable launch vehicle which has been assumed to be a NASA Space Shuttle. In the prototype which has been designed, the coupled satellite and the rocket booster occupy a substantial portion of a cargo bay of a space shuttle which measures 15 feet in diameter by 60 feet in length.

Once the supporting structure and objective lens have been rotated and fully deployed, the coupling assembly 124 (FIG. 21) may be actuated to separate the rocket booster 126 away from the supporting structure and lens. This is desirable since it substantially reduces the mass which must be moved by the thrusters 110 and 112. In addition to the thrusters, it is desirable to utilize control moment gyros and/or the thrusters 110 nd 112 to permit the orientation of the satellite structure to be changed on a frequent basis. Such control moment gyros are widely used in present day satellites. The control moment gyros for the satellite structure of the present invention are operated off of electric currents supplied from the photovoltaic array 114.

Either the control moment gyros or the thrusters 112 and 110 which extend to the ends of the two astro masts can be used to control the orientation of the lens. Because in the preferred design the lens is rotating, the torque must be applied around an axis 90 degrees from the axis of motion desired to cause gyroscopic precession of the rotating mass of the lens. A star tracker system combined with a control computer (both are not shown but are widely used in current satellites) may be used to control the control moment gyros and thrusters. A command receiver (also widely used in current satellites) receives commands transmitted by radio from the ground to direct changes in orientation or orbit velocity to the control computer.

In order to focus the image of an astronomical object so that it will pass across a selected location of an array on the earth's surface and be in proper focus the orbit of the orbiting lens is precisely adjusted. The ion thrusters 110 and 112 in FIG. 21 provide the acceleration necessary to adjust the orbit. The direction, time of thrusting and optionally the magnitude of thrusting are controlled from the onboard control computer based on commands received by the command receiver and using data from onboard instruments. The technique is well known and adapted from that used in control of interplanetary probes and in many earth satellites including the global position satellite. Because of the wide usage the details have not been described.

If there is a net difference in the thrust direction and/or magnitude of the two thrusters, a precession force is created that is used to precess the axis of rotation of the rotating lens. The vector combination of the thrust from the two thrusters accelerates the objective lens satellite. If the net thrust is applied along the orbit near apogee, it will raise the perigee altitude. If it is applied along the orbit direction near perigee, it will raise the apogee altitude. If applied in the opposite direction, the apogee altitude will be reduced. By applying the thrust at appropriate times and directions the orbit apogee height, period, the direction of the apogee from the earth center and the orbit orientation can be controlled.

The track verification telescope 144 in FIG. 23 as well as data from the array provides input data to establish the orbit of the lens so that corrections can be computed to achieve the desired orbit. FIG. 4 provides an appropriate summary of some of the orbit characteristics. Orbit computations have been developed to a high state of the art for control of satellites.

Figure 27:
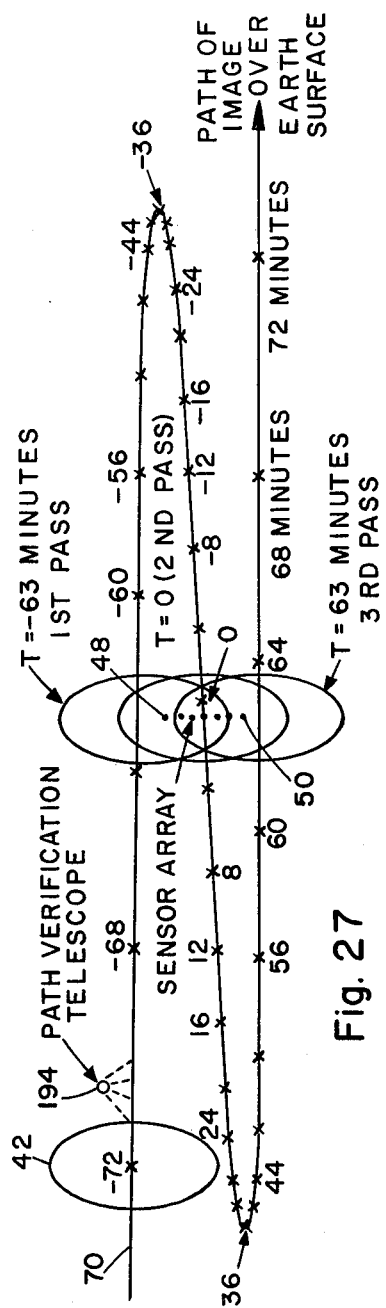
FIGS. 27 and 28 are simplified diagramatic views illustrating a preferred embodiment of the method of the present invention in which the image focused by the objective lens makes three separate passes across the sensor array during one orbit and in which the data generated during the three separate passes is combined to form a composite picture of the astronomical object.

Details of the ground-based portions of the system of the present invention will now be described. A portion of the sensor array 48 is illustrated in FIG. 23. As previously described, the orbit and orientation of the objective lens 30 are chosen so that light or other radiation from a preselected astronomical object is focused into an image which moves slowly across the surface of the earth. The array 48 is positioned on the surface of the earth so that the image focused by the orbiting objective lens will travel substantially perpendicularly across the row during an observation as illustrated in FIGS. 2B, 9 and 27. The sensor array 48 is divided into a plurality of segments 138 (FIG. 23) each being comprised of a predetermined number of sensing units 50.

The sensor array 48 (FIG. 23) comprises a very long row of individual sensing units oriented so that the image will move substantially perpendicularly across the row during an observation. For example, one thousand sensing units 50 may be lined up in a row. Each of the sensing units provides one scan line of the image being observed as the image passes by it. Output data generated from the sensing units is fed to the recording and display van 53. As explained more fully hereafter, the van contains equipment for multiplexing the output data generated from the sensing units and further contains a real time processor which manipulates the multiplexed data in order to produce display signals. The display signals are fed to a suitable display device which produces a picture of the astronomical object. The recording and display van 53 enables the bulk of the electronic processing equipment to be rapidly moved to different locations on the earth along with the sensing units so that observations may be made from desirable locations, much in the fashion of eclipse expeditions. The recording and display van 53 receives the power necessary to operate the equipment contained therein from a portable generator 142.

A track verification telescope 144, which may be a remotely controlled telescope with remote viewing such as those which currently exists, is utilized for providing the precise position location information regarding the orbiting lens to the recording and display van 53 by radio communication. Since the observations will be made at night, the powerful strobe light 132 (FIGS. 21 and 22) will enable the track verification telescope to track the position of the orbiting lens with respect to the star field background once the same has been located by means of smaller sighting telescopes or binoculars or from predicted orbital data. In addition, commands are sent to, and information is received from, the objective lens satellite through RF signals. These signals are transmitted between the communications equipment on board the satellite in the housing 136 (FIG. 21) and communications equipment 146 (FIG. 26) within the van 53 through a ground based antenna 148. Information is communicated between the recording and display van 53 and the track verification telescope 144 through a microwave data link 149 (FIGS. 23 and 26).

In the illustrated example of the sensor array 48 shown in FIG. 23, there are approximately ten sensing units for each of the array segments 138. The sensing units of the array 48 are preferably each spaced about one resolution element apart. The size of the resolution element depends on the size of the objective lens 30 and the distance from the lens to the sensing units. This distance also determines the frequency band that is in focus for the observation.

A preferred embodiment of the sensing units is illustrated in simplified form in FIG. 24, there being two such units shown in that figure. Preferably, each of the sensing units 50 (FIG. 23) includes a concave mirror 150 (FIG. 24) having a relatively small diameter, for example 8 inches. This mirror is used to focus onto a low-level light detector 152, the light 154 received over the mirror's diameter from the direction of the occultation of the object to be viewed through the orbiting lens.

Each low-level light detector may include four fiber optic lines 156 (FIG. 25A) having flared ends 158 (FIG. 25B). The ends 158 of each group are clustered to form a four-quadrant sensing element behind a bandpass filter 160 (FIG. 24). Each of the mirrors 150 (FIG. 24) intercepts a portion of the radiation 154 in the image and focuses it on the ends 158 (FIG. 25A) of the fiber-optic lines which are arranged at the focal point of the concave mirror 150 (FIG. 24). A portion 164 (FIG. 25B) of the image is centrally focused on the cluster of pie-shaped ends 158 of the fiber-optic lines.

Preferably the fiber-optic lines from ten of the sensing units 50 (making a total of 40 lines) are coupled to an electronic low-level light detector 166 (FIG. 24) which is capable of generating output data representative of the intensity of radiation striking the ends 158 of each of the fiber optic lines. Preferably, the detector 166 has a very high sensitivity. One suitable detector for this purpose is sold under the trademark DIGICON by Electronic Vision Company, a division of Science Applications, Inc., located at 11526 Sorrento Valley Road, San Diego in the State of California, in the United States. That DIGICON device utilizes a photoemissive cathode which emits photoelectrons on one side in response to radiation striking its other side. The photoelectrons are detected by solid state devices arranged in a grid, which in turn emit signals representative of the radiation intensity. Alternatively, the low-level light detector 166 could be constructed with photomultiplier tubes.

Preferably, where a forty channel DIGICON device has been utilized as the low-level light detector 166, the detector is coupled to a plurality of pulse height discriminators and counters 168 (FIG. 24). This allows detection and counting of individual photo electrons with a low false electron count. The output of the detector 166 and the pulse height discriminators and counters 168 is in the form of digitized signals representative of the radiation portion received by the concave sensing mirrors 150 associated with each of the detectors 166. The output from the pulse height discriminators and counters 168 is fed to a multiplexer 170.

A plurality of sensing telescope servo drives and accompanying circuitry 172 receive data from the multiplexer 170 and determine whether or not the image portions 164 (FIG. 25B) are striking all of the ends 158 in each of the clusters. If the image portions are not striking all of the ends 158 in the clusters, it indicates that the sensing units are not pointed precisely toward the objective lens. The servo circuitry and drives 172 respond to this condition and point the sensing units 50 in the row 48 (FIG. 23) at the lens 30 (FIG. 1). If desired, groups of the sensing units 50 may be coupled together mechanically and pivoted by electro-mechanical drives responsive to the circuitry and servo drives 172. It will be understood that as the image passes across the row of sensing units, the individual sensing units may be pivoted in a continuous manner in order to insure that the image portions 164 are centered on the clusters of fiber-optic 158. The sensing telescope circuitry and servo drives also operate in conjunction with data received from the track verification telescope 144 (FIG. 23) so that the sensing units 50 can be initially pointed in the optimum direction for initially receiving the image 42.

As the image passes perpendicularly across the row of sensing units 50 (see FIG. 2) the data generated from each of the sensing units provides one scan line of the image. Data from the multiplexer 170 may be fed directly to a real time processor 174 (FIG. 26) which manipulates the data with respect to real time in order to produce display signals representative of the image. The real time processor 174 can store and retrive information from a set of mass storage devices 175 which may take the form of magnetic tape drives or disk drives.

It may be desirable to have multiple parallel rows such as 48 (FIG. 23) of sensing units. Such parallel arrays will enable the ground receiving station to better discriminate against noise pulses during the observation process and to verify data generated by preceding rows. Furthermore, multiple arrays will enable the light gathering power of the system to be increased by increasing the signal-to-noise ratio through properly combining the signals from the sensing units in each of the rows. Where multiple rows of sensing units are utilized, the output data generated from each of the rows is fed to a second multiplexer 176 (FIG. 26) which in turn feeds signals to the real time processor 174.

Clock means are provided in the ground-based portion of the system for enabling the multiplexed data to be manipulated by the processor 174 with respect to time in order to produce the display signals that are used to generate the picture of the image. At present, the United States Air Force maintains and operates the initial portion of a Global Position System (GPS). That system includes orbiting satellites which transfers the exact time from a cesium beam clock from one ground station to another. The system will be able to transfer precise time signals from the National Bureau of Standards or the Naval Observatory or other precision time reference sources to various points on the globe. Referring to FIG. 26, these time signals may be referenced by the system of the present invention through a GPS antenna 178 connected to GPS time reference equipment 180 located within the recording and display van 53. The GPS time reference equipment is operatively connected to the real time processor 174. The processor may manipulate the data generated from the sensing units utilizing time information obtained directly from the GPS communications equipment during an observation. However, it is preferable to use the GPS time reference communications equipment to set a cesium beam clock 182 mounted within the van 53. The processor 174 thereafter references time during an observation from the cesium beam clock 182 instead of through the GPS time reference link. This latter arrangement is desired since an observation can be successfully completed even though there may be a breakdown in the GPS time reference link during the observation.

Display signals generated by the real time processor 174 (FIG. 26) are transmitted to suitable display equipment 184 which may comprise a CRT or hard copy machine which produces a human viewable picture of the astronomical object being observed. The system may be monitored and operated from a control console 186 which is coupled to suitable command circuitry within the processor 174 for directing the control of the various components of the system. Power supplied to the system by the remote portable generator 142 passes through a power control 190.

Figure 28:
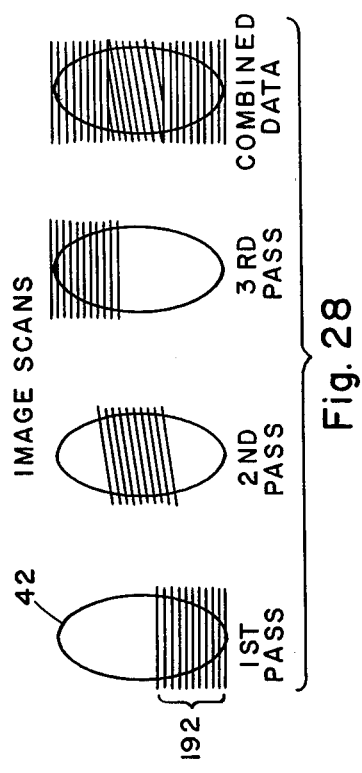

FIGS. 27 and 28 illustrate a variation of the method of the present invention in which three separate passes are made over the row of sensing units during one orbit of the objective lens about the earth. The output data generated from the sensing units is combined to provide a composite picture of the object being observed. The line 70 in FIG. 27 represents the ground track of the center of the image 42 on the surface of the earth. This particular ground track is achieved during one orbit of the objective lens by selecting the orbit as previously described in conjunction with FIG. 9. The markings on the ground tracks 70 in FIG. 27 together with the corresponding negative and positive numbers indicate the relative position of the image at various time instances before and after a reference time $t=0$. It will be observed that the row 48 of sensing units is positioned on the surface of the earth so that the ground track 70 crosses the row 48 substantially perpendicularly on three separate occasions, namely at time instances $t=-63$ minutes, $t=0$ and $t=+63$ minutes.

In FIG. 27 only a few of the optical sensing units 50 have been illustrated. The triple pass method may be utilized where the north/south axis of the eliptically shaped image 41 is substantially greater than the length of the row 48 of sensing units. Since the sensing units preferably should be placed approximately one resolution element apart this limits the length of the array 48 of sensing units which can be achieved with a given number of sensing units without loss in resolution. Therefore, the triple pass method can be utilized to enable images to be reproduced which have a larger dimension than the length of the row of sensing units which is available. Also observations on multiple orbits may be used to extend the area covered. Human observers using binoculars or small telescopes can be used to extend the coverage of the ground based sensing units to search for targets to be observed with the sensor array on subsequent orbits.

Each of the sensing units 50 provides one scan line of the image 42. In FIG. 28 the scan lines are shown as a plurality of individual lines 192 extending horizontally across the page parallel to one another. The sequence of illustrations in FIG. 28 indicates the manner in which scan lines for the lower, intermediate, and upper portions of the eliptical image 42 are provided by the sensing units of the array 48 during the first, second and third passes, respectively. The last illustration of FIG. 28 depicts the manner in which the data generated from the first, second and third passes is combined through the circuitry described in conjunction with FIG. 26 in order to produce a composite picture of the image.

A path verification telescope 194 (FIG. 27) may be provided for measuring the error in the predicted ground track prior to the arrival of the image 42 at the row of the sensing units. This telescope may be used to measure the angle between the light emitted from the strobe 132 (FIGS. 21 and 22) in the satellite and the astronomical object being imaged, as a function of time.

Having described preferred embodiments of the system and method of the present invention, it should be apparent to those skilled in the art that the invention may be modified in arrangement and detail. For example, FIG. 29 depicts a variation in the system in which the earth's moon 196 may be utilized as a lens for focusing a radio image 198 of a distant electromagnetic radiation source 200 on the surface of the earth 202. An array of microwave receivers 204 tuned to the proper frequency may be utilized to detect the electromagnetic radiation image 198 as it moves over the surface of the earth and to produce data which can manipulated to produce a picture of the source 200 being observed. Useful data may be obtainable at more than one frequency utilizing the Moon as a lens. Other celestial bodies besides the Moon could be utilized as the lens provided the sensors operate at the proper frequency and the radiation is in a frequency range that will penetrate the earth's atmosphere. In view of the fact that modifications may be made to the system and method of the present invention, the protection afforded the invention should be limited only in accordance with the scope of the following claims.

I claim:

1. A telescope system for enabling the viewing of astronomical objects surrounding a planet, comprising:
    objective lens means for gathering and transmitting radiation from the astronomical objects;
    means for placing the objective lens means in a predetermined orbit around the planet;
    means for enabling the orbit and orientation of the objective lens means to be altered for focusing radiation from a preselected one of the astronomical objects into an image on the surface of the planet, the orbit of the objective lens means being selected to cause the image to move across the surface of the planet at a predetermined rate;
    sensing means located on the surface of the planet for detecting the image and outputting data representative of the image;
    processing means for receiving the data from the sensing means and producing display signals representative of the data; and display means for receiving the display signals from the processing means and producing a picture of the preselected astronomical object.

2. A system according to claim 1 wherein the objective lens means includes a Fresnel zone plate for focusing the radiation from the preselected one of the astronomical objects into the image on the surface of the planet.

3. A system according to claim 1 wherein the objective lens means includes:
a membrane made of a flexible material transparent to the radiation; and
means for supporting and rotating the membrane about an axis to cause the membrane to extend substantially in a plane perpendicular to the axis; and
the membrane being dimensioned in thickness for focusing the radiation from the preselected one of the astronomical objects into the image on the surface of the planet.

4. A system according to claim 1 and further comprising:
means for tracking the orbital position of the objective lens means; and
means responsive to the tracking means for pointing the sensing means at the objective lens means.

5. A system according to claim 1 wherein the sensing means includes at least one row of sensing units located on the surface of the planet so that the image will move substantially perpendicularly across the row, the sensing units of the one row each intercepting a portion of the radiation in the image and outputting data representative of one scan line of the image as the image moves across the row.

6. A system according to claim 5 wherein the processing means includes:
means for multiplexing the output data received from the sensing units; and
clock means for enabling the multiplexed data to be manipulated with respect to real time to produce the display signals.

7. A system according to claim 5 wherein the sensing units in the one row are spaced approximately one resolution element apart.

8. A system according to claim 5 wherein each sensing unit includes:
a concave mirror for receiving the radiation portion and focusing it at a focal point; and
means located at the focal point for detecting the radiation portion.

9. A system according to claim 1 wherein the sensing means includes at least one photoemissive light sensor.

10. A method of viewing astonomical objects surrounding a planet comprising the steps of:
placing an objective lens capable of gathering and transmitting radiation from astronomical objects into an orbit about the planet;
adjusting the orbit and orientation of the objective lens to focus radiation from a preselected one of the astronomical objects into an image which moves on the surface of the planet at a predetermined rate;
sensing the image on the surface of the planet and generating output data representative of the image; and
processing the output data to produce a picture of the image.

11. A method according to claim 10 wherein the sensing is performed by moving the image substantially perpendicularly across at least one row of sensing units each spaced approximately one resolution element apart, each of the units intercepting a portion of the radiation of the image and outputting data representative of one scan line of the image.

12. A method according to claim 11 wherein the orbit of objective lens is selected so that the image makes a plurality of passes across the row of sensing units.

13. A method according to claim 10 wherein a Fresnel zone plate is utilized as the objective lens.

14. A method according to claim 10, wherein the objective lens is provided by supporting and rotating about an axis a membrane made of a flexible material transparent to the radiation to cause the membrane to extend substantially in a plane perpendicular to the axis, the membrane being dimensioned in thickness for focusing the radiation from the preselected astronomical object into the image on the surface of the plane.

15. A method according to claim 11 wherein the processing step includes the steps of multiplexing the output data from the sensing units and manipulating the multiplexed data with respect to real time to produce the picture.

16. A system for producing on a planet a picture of a distant astronomical object, comprising:
objective lens means for gathering and transmitting radiation from astronomical objects;
means for placing the objective lens means in a predetermined orbit around the planet;
means for enabling the orbit and orientation of the objective lens means to be altered for focusing radiation from a preselected one of the astronomical objects into an image on the surface of the planet, the orbit of the objective lens means being selected to cause the image to move across the surface of the planet at a predetermined rate;
at least one row of sensing units located on the surface of the planet so that the image will move substantially perpendicularly across the row, the sensing units of the one row each intercepting a portion of the image and outputting data representative of one scan line of the image as the image moves across the row;
processing means for receiving the data from the sensing units and producing display signals representative of the data; and
display means for receiving the display signals from the processing means and producing a picture of the preselected astronomical object.

17. A system according to claim 16 and further comprising:
means for tracking the orbital position of the lens; and
means responsive to the tracking means for pointing the sensing units at the lens.

18. A system according to claim 16 wherein the processing means includes:
means for multiplexing the output data from the sensing units; and
clock means for enabling the multiplexed data to be manipulated with respect to real time to produce the display signals.

19. A system according to claim 16 wherein each sensing unit includes:
a concave mirror for receiving a portion of the image and focusing it at a focal point; and
means located at the focal point for detecting the focussed image portion.

* * * * *